(12) United States Patent
Beluri et al.

(10) Patent No.: US 9,723,510 B1
(45) Date of Patent: Aug. 1, 2017

(54) CREATION AND USAGE OF RADIO MAPS FOR CLOUD-BASED CONTROL OF SELF ORGANIZING NETWORKS

(71) Applicant: XCellAir, Inc., Melville, NY (US)

(72) Inventors: Miki Beluri, Jericho, NY (US); Martino Freda, Montreal (CA); Yuying Dai, Brossard (CA); Jean-Louis Gauvreau, La Prairie (CA); Joe Murray, Schwenksville, PA (US)

( * ) Notice: Subject to any disclaimer, the term of this patent is extended or adjusted under 35 U.S.C. 154(b) by 0 days.

(21) Appl. No.: 15/249,177

(22) Filed: Aug. 26, 2016

(51) Int. Cl.
*H04W 24/10* (2009.01)
*H04B 17/318* (2015.01)
*H04W 4/04* (2009.01)
*H04W 84/18* (2009.01)

(52) U.S. Cl.
CPC .......... *H04W 24/10* (2013.01); *H04B 17/318* (2015.01); *H04W 4/043* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,343,290 B1* | 1/2002 | Cossins | ............... | H04L 41/0253 |
| 8,588,097 B1* | 11/2013 | Ogale | ................... | H04W 64/00 342/463 |
| 8,654,672 B1* | 2/2014 | Nicholas | ............. | H04W 40/246 370/254 |
| 8,994,591 B2* | 3/2015 | Dupray | ................ | G01C 21/206 342/457 |
| 2001/0022558 A1* | 9/2001 | Karr, Jr. | .................. | G01S 1/026 342/450 |
| 2003/0083073 A1* | 5/2003 | Cossins | ............... | H04L 41/0253 455/446 |
| 2007/0280165 A1* | 12/2007 | Doshi | ..................... | H04L 41/12 370/331 |
| 2012/0038662 A1* | 2/2012 | Dicklin | ............. | G06F 17/30241 345/593 |
| 2012/0231808 A1* | 9/2012 | Moeglein | .............. | G01S 5/0236 455/456.1 |
| 2013/0196685 A1* | 8/2013 | Griff | ..................... | H04L 43/067 455/456.1 |
| 2015/0312774 A1* | 10/2015 | Lau | ....................... | H04W 16/20 455/446 |

* cited by examiner

*Primary Examiner* — Ernest Tacsik
(74) *Attorney, Agent, or Firm* — EIP US LLP

(57) ABSTRACT

The present application is directed to wireless communication networks. More specifically, the present application is directed to creation and usage of radio maps for cloud-based control of self-organizing networks. Methods for localizing elements in a wireless network are provided. Methods for operating a wireless communication network. Apparatuses configured to operate within a wireless communication network are provided. Apparatuses configured to operate within a wireless communication network are provided.

26 Claims, 22 Drawing Sheets

CREATION AND USAGE OF RADIO MAPS FOR CLOUD-BASED CONTROL OF SELF ORGANIZING NETWORKS

BACKGROUND

The present application is directed to wireless communication networks. More specifically, the present application is directed to creation and usage of radio maps for cloud-based control of self-organizing networks.

Current self-organizing networks are typically managed by a single operator and utilize a single radio access technology concentrated in a single communication frequency spectrum. The use of a single operator and a single radio access technology may mean such self-organizing networks are not able to effectively manage the broader wireless communication frequency spectrum outside what is managed by the single radio access technology. This may subject the self-organizing network to interference and reduced efficiency in those unmanaged portions of the broader frequency spectrum. Moreover, because current self-organizing networks are single operator, single radio access technology, they do not offer true plug-and-play functionality. Instead, manual access point installation and a priori knowledge of existing base station network topology is usually required. Thereafter, manual management of operational aspects of such access points has given rise to high operational cost and inability to effectively manage networks at scale. Accordingly, solutions for deploying and managing self-organizing networks are desirable.

SUMMARY

In some embodiments, a method for localizing elements in a wireless network is provided. The method includes generating a radio map by defining a matrix of pixels, identifying an initial device pixel of the matrix of pixels as a known location for each initial device of a plurality of initial devices, for each straight-line path between two initial device pixels: determining an attenuation factor associated with the straight-line path based at least in part on a received signal strength of a communication between the two initial devices, and assigning a color to each pixel traversed by the straight-line path based at least in part on the attenuation factor, determining a plurality of estimated locations for a second device based at least in part on received signal strengths of communications between the second device and each of a subset of the plurality of initial devices, and identifying a second pixel of the matrix of pixels as a selected location of the second device based at least in part on an accuracy value associated with each of the plurality of estimated locations.

In some embodiments, a method for operating a wireless communication network is provided. The method includes receiving a communication configuring an event to be monitored, configuring measurements to be made by one or more devices based at least in part on the event to be monitored, receiving measurements taken by the one or more devices based on the configuring, determining occurrence of the event based at least in part on the received measurements from the one or more devices and a radio map indicating a location of each of the one or more devices, transmitting a notification indicating the occurrence of the event, and reconfiguring at least one communication parameter of the one or more devices based at least in part on the occurrence of the event.

In some embodiments, an apparatus configured to operate within a wireless communication network is provided. The apparatus comprises a processor. The processor is configured to generate a radio map by defining a matrix of pixels, identifying an initial device pixel of the matrix of pixels as a known location for each initial device of a plurality of initial devices, for each straight-line path between two initial device pixels: determining an attenuation factor associated with the straight-line path based at least in part on a received signal strength of a communication between the two initial devices, and assigning a color to each pixel traversed by the straight-line path based at least in part on the attenuation factor, determining a plurality of estimated locations for a second device based at least in part on received signal strengths of communications between the second device and each of a subset of the plurality of initial devices, and identifying a second pixel of the matrix of pixels as a selected location of the second device based at least in part on an accuracy value associated with each of the plurality of estimated locations.

In some embodiments, an apparatus configured to operate within a wireless communication network is provided. The apparatus comprises a processor. The processor is configured to receive a communication configuring an event to be monitored, configure measurements to be made by one or more devices based at least in part on the event to be monitored, receive measurements taken by the one or more devices based on the configuring, determine occurrence of the event based at least in part on the received measurements from the one or more devices and a radio map indicating a location of each of the one or more devices, transmit a notification indicating the occurrence of the event, and reconfigure at least one communication parameter of the one or more devices based at least in part on the occurrence of the event.

DETAILED DESCRIPTION OF CERTAIN INVENTIVE EMBODIMENTS

Improved cloud-based self-organizing network (SON) solutions may provide a more complete view of an interference environment within the self-organizing network. To enable a true multi-vendor, multi-radio access technology (RAT), cloud-based self-organizing network solution, a radio map indicating the locations of all devices within the boundaries or communication range of the self-organizing network, their communication channels, and any path obstructions (e.g., walls) within the self-organizing network boundaries may be desired. Ideally, such a radio map should be portable, scalable and not require extensive field measurements before deployment. Such a radio map may leverage measurements at the application layer from a variety of network-connected devices, such as small cell nodes (e.g., access points, femtocells, picocells, microcells, enhanced nodeBs (eNodeBs), and others as would be known to those of skill in the art) and mobile terminals (e.g., stations (STAs), user equipments (UEs), mobile terminals, and others as would be known to those of skill in the art) to build and maintain the radio map. Such a radio map may support devices that do not have accurate indoor location capabilities and may reflect real-time (or near real-time) changes to the current spectrum usage in an area. Such a radio map may desirably interface with a radio resource manager (RRM) or the like to enable channel management for efficient use of the communication frequency spectrum. Such a radio map may additionally locate and track mobile terminals to enable efficient and consistent delivery of location-specific services. In addition, the resolution of such a radio map may be adapted in real-time, in near real-time, or periodically to enable effective radio resource management as well as accurate positioning and tracking of associated devices in a network. Methods and apparatuses are described herein for the creation and usage of radio maps for cloud-based management of self-organizing networks.

Figure 1:
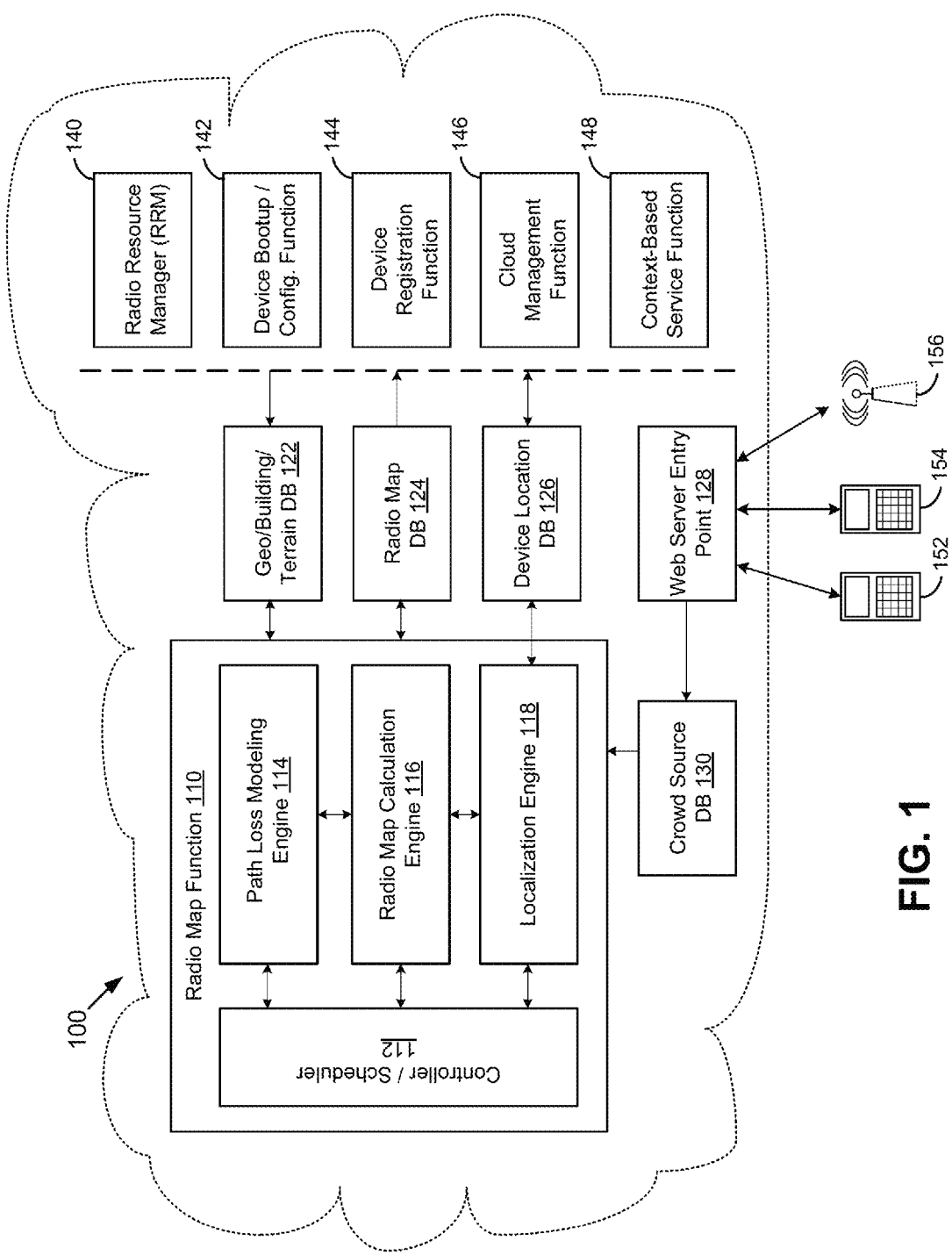
FIG. 1 illustrates a simplified diagram of architecture for a cloud-based self-organizing network, in accordance with some embodiments.

FIG. 1 illustrates a simplified diagram of an architecture for a cloud-based self-organizing network 100, in accordance with some embodiments. Network 100 comprises a radio map function 110 configured to generate a radio map that may be utilized for managing and optimizing network 100. Radio map function 110 may be implemented by a single processor or computer, or collectively by a distributed network of individual processors or computers within or otherwise serving the cloud. Radio map function 110 may comprise a path loss modeling engine 114, a radio map calculation engine 116, a localization engine 118 and a controller (or scheduler) 112, each in communication with one another. Path loss modeling engine 114 is configured to estimate path loss between any two wireless communication devices associated with network 100. Radio map calculation engine 116 is configured to perform certain calculations related to generation, maintenance and updating of a radio map as will be described in more detail below. Localization engine 118 is configured to perform certain calculations related to determining a position of one or more wireless communication devices associated with network 100. Controller (or scheduler) 112 is configured to control one or more aspects of operation of any of the engines 114, 116, 118 and/or of radio map function 110 as a whole.

Network 100 may additionally comprise a geography/building/terrain (GBT) database 122 in communication with radio map function 110 and network 100 in general. The GTB database 122 is configured to receive information related to the geography, terrain and/or buildings at particular physical locations from network 100, store such information and provide such information to radio map function 110.

Network 100 may additionally comprise a radio map database 124 in communication with radio map function 110 and network 100 in general. Radio map database 124 is configured to store one or more radio maps generated by radio map function 110 and provide these radio maps to radio map function 110 and/or network 100 in general upon request or without request depending upon the particular implementation.

Network 100 may additionally comprise a device location database 126 in communication with radio map function 110, specifically localization engine 118, and network 100 in general. Location database 126 is configured to store the current and/or historical locations of one or more wireless communication devices associated with network 100.

Network 100 may additionally comprise a crowd source database 130 in communication with radio map function 110. Crowd source database 130 is configured to receive and store data collected from wireless communication devices associated with network 100 and provide that data to radio map function 110. Network 100 may additionally comprise a web server entry point 128 configured to provide gateway and connectivity functions that allow communication between network devices (e.g., devices 152, 154, 156) and network 100. Network devices may include wireless or wired devices in network communication with network 100.

Network 100 may additionally comprise a plurality of additional modules, managers or functions including one or more of a radio resource manager (RRM) 140, a device bootup and/or configuration function 142, a device registration function 144, a cloud management function 146 and a context-based service function 148. RRM 140 is configured to perform communication channel selection and interference mitigation for network devices (e.g., devices 152, 154, 156) associated with network 100. Device bootup/configuration function 142 is configured to perform functions related to the boot up and/or configuration of network devices (e.g., access points or enhanced node Bs (eNodeBs)) that service small subnetworks or cells within and associated with network 100). Device registration function 144 is configured to perform registration of network devices (e.g., devices 152, 154, 156) as they associate and dissociate with network 100. Cloud management function 146 is configured to provide general management of the cloud (e.g., network 100). Context-based service function 148 is configured to provide location-specific data to radio map function 110 and to network 100 generally.

Embodiments described below may be described in connection with or in the context of network 100 shown in FIG. 1. Moreover, unless otherwise specified, one or more processes, steps, functions or procedures described herein may be performed on or by one or more processors of one or more cloud servers, thus providing access to a holistic view of the network 100. In addition, in some embodiments, radio maps as described herein may utilize the concept of zones having, in some cases, defined sizes (e.g., 100 meters×100 meters), the zones being usable to limit the number of access points being considered by a process, step, function or procedure at any one time.

Figure 2:
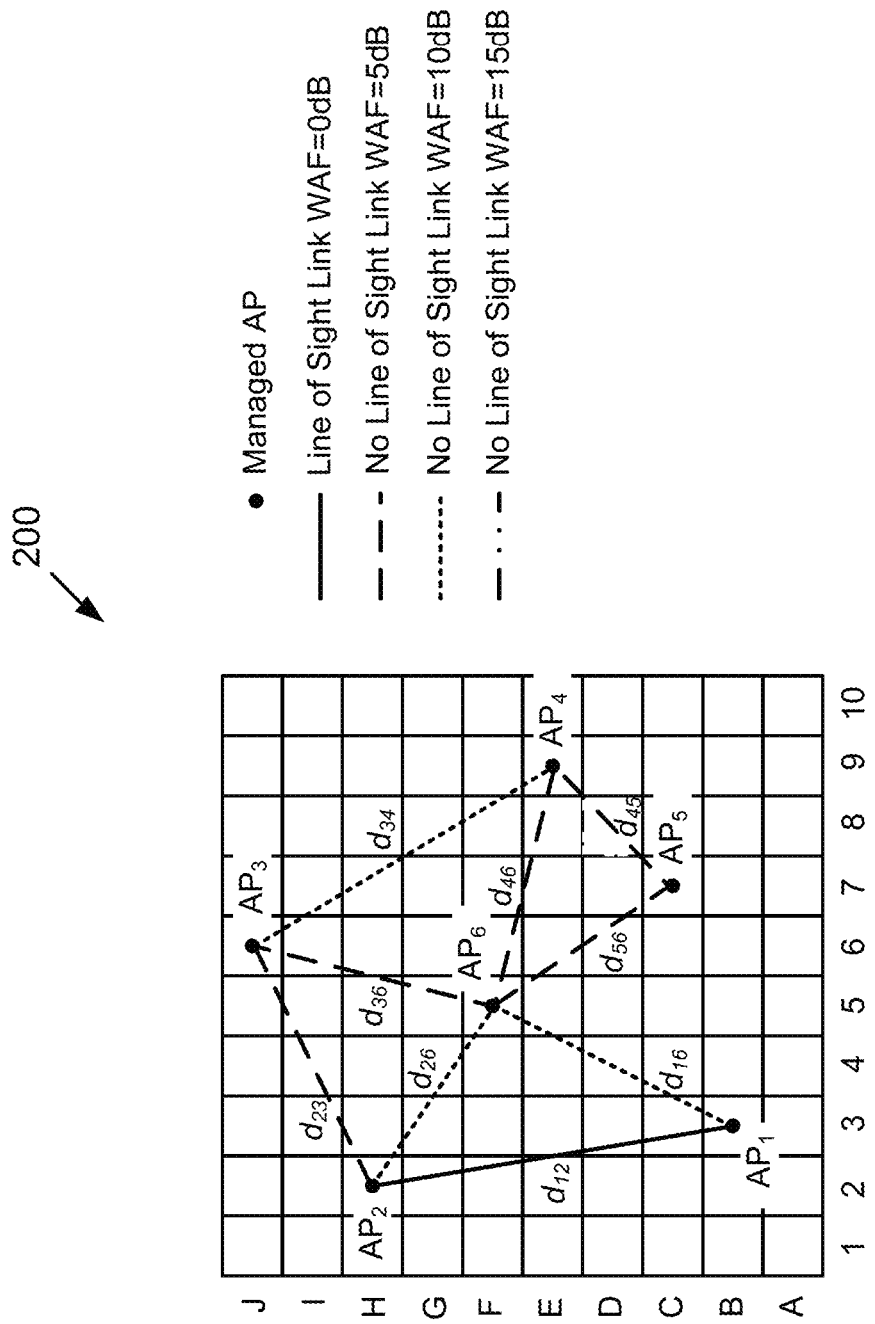
FIG. 2 illustrates an example radio map indicating a plurality of located access points, in accordance with some embodiments.

FIG. 2 illustrates an example radio map 200 indicating a plurality of access points (APs) with known locations, in accordance with some embodiments. As used herein, the term "located" as it relates to a device indicates that, among other things, its location is known in advance and, thus, is not subsequently estimated or determined. Further, the term "unlocated" as it relates to a device indicates that, among other things, its location is not known in advance.

Radio map 200 comprises a matrix of pixels, each pixel indicating or associated with a unique physical area. Although a 10×10 matrix of pixels is shown, the present application is not so limited and any number of rows and columns of pixels are contemplated. Moreover, each pixel may correspond to a predetermined physical area (e.g., a 2 meter×2 meter area). In some embodiments, each pixel may be associated with a set of latitude and longitude values and also with a pixel cell number (e.g., A1-J10).

Radio map 200 indicates a plurality of located access points (APs): $AP_1$, $AP_2$, $AP_3$, $AP_4$, $AP_5$, $AP_6$ (hereinafter $AP_1$-$AP_6$). Since the locations of $AP_1$-$AP_6$ are known in advance, the distances $d_{12}$, $d_{16}$, $d_{23}$, $d_{26}$, $d_{34}$, $d_{36}$, $d_{45}$, $d_{46}$, $d_{56}$ between pairs of $AP_1$-$AP_6$ may be calculated. Once these distances are calculated, a straight-line path loss (e.g., in dB) may be determined between pairs of $AP_1$-$AP_6$. Path loss may have two components: a standard path loss model $L_{ITU}$ such as disclosed in Rec. ITU-R P.1238-1 ("Propagation data and prediction methods for the planning of indoor radio communication systems and radio local area networks in the frequency range 300 MHz to 100 GHz") (see EQ. 1), and an additional wall attenuation factor (WAF) (see EQ. 2) that accounts for additional signal attenuation caused by walls or other indoor obstructions along a particular straight-line path.

$$L_{ITU} = 20 \log(f) + N \log_{10}(d) + L_f(n) - 28 \qquad \text{EQ. 1:}$$

In EQ. 1, above, N is a power loss coefficient, f is the frequency in MHz, d is the distance between devices in meters, Lf is a floor penetration loss factor in dB and n is the number of floors penetrated. For example, for Wi-Fi operation in the 2.4 GHz band, f=2400, N=30, Lf(1)=15, and d is the distance between two communicating devices. These values or others may be used for other bands, such as 5 GHz Wi-Fi or 500 MHz UHF.

In some embodiments, the path loss component N may be based on empirical measurements collected in different environments. In such cases, the path loss component N may be an average or other derivation of those empirical measurements. Consequently, the path loss component N may not be a perfect fit for any given environment. Thus the wall attenuation factor may be used to fine tune the path loss model.

Multiple path loss models may be supported by keeping the path loss component N constant (e.g., N=30) and adding an offset wall attenuation factor (WAF) to account for propagation through obstructions, such as cubical or office walls. In the alternative, the path loss component N may be variable and/or may absorb the WAF into its term. Where path loss component N is held constant, total path loss $L_{TOT}$ may be calculated utilizing EQ. 2.

$$L_{TOT} = L_{ITU} + WAF \qquad \text{EQ. 2:}$$

In EQ. 2, above, WAF=0 dB, for line of sight (LOS) paths having no other obstructions, or any of the discrete values 5 dB, 10 dB, or 15 dB for non-line of sight (NLOS) paths having one or more obstructions.

Utilizing received signal strength (RSS) measurements reported by each of $AP_1$-$AP_6$ for communications transmitted by each of $AP_1$-$AP_6$, and the calculated distances $d_{12}$, $d_{16}$, $d_{23}$, $d_{26}$, $d_{34}$, $d_{36}$, $d_{45}$, $d_{46}$, $d_{56}$ between adjacent pairs of $AP_1$-$AP_6$, the wall attenuation factor of each straight-line path may be determined based at least in part on EQs. 1 and 2 above. In other words, the RSS measurements reported by each of $AP_1$-$AP_6$ may be converted to a path loss value or to a wall attenuation factor associated with the straight-line path between adjacent pairs of $AP_1$-$AP_6$. For example, as shown in FIG. 2, the straight-line paths $AP_1$-to-$AP_2$, $AP_1$-to-$AP_6$ and $AP_2$-to-$AP_6$ are shown having a line of sight wall attenuation factor of 0 dB (solid line), straight-line paths $AP_2$-to-$AP_3$, $AP_3$-to-$AP_6$, $AP_4$-to-$AP_5$, $AP_4$-to-$AP_6$, and $AP_5$-to-$AP_6$ are shown having a non-line of sight wall attenuation factor of 5 dB (dotted line), and straight-line path $AP_3$-to-$AP_4$ is shown having a non-line of sight wall attenuation factor of 10 dB (dashed line). In some embodiments, a wall attenuation factor of "X" dB may be understood to indicate that the loss along the associated straight-line path between devices separated by a known distance d is "X" dB greater than for two devices having line of sight and separated by the known distance d. In other words, the wall attenuation factor accounts for the additional path loss on a path between two points based on obstructions as compared to the path loss along the path in a completely unobstructed space.

Figure 3:
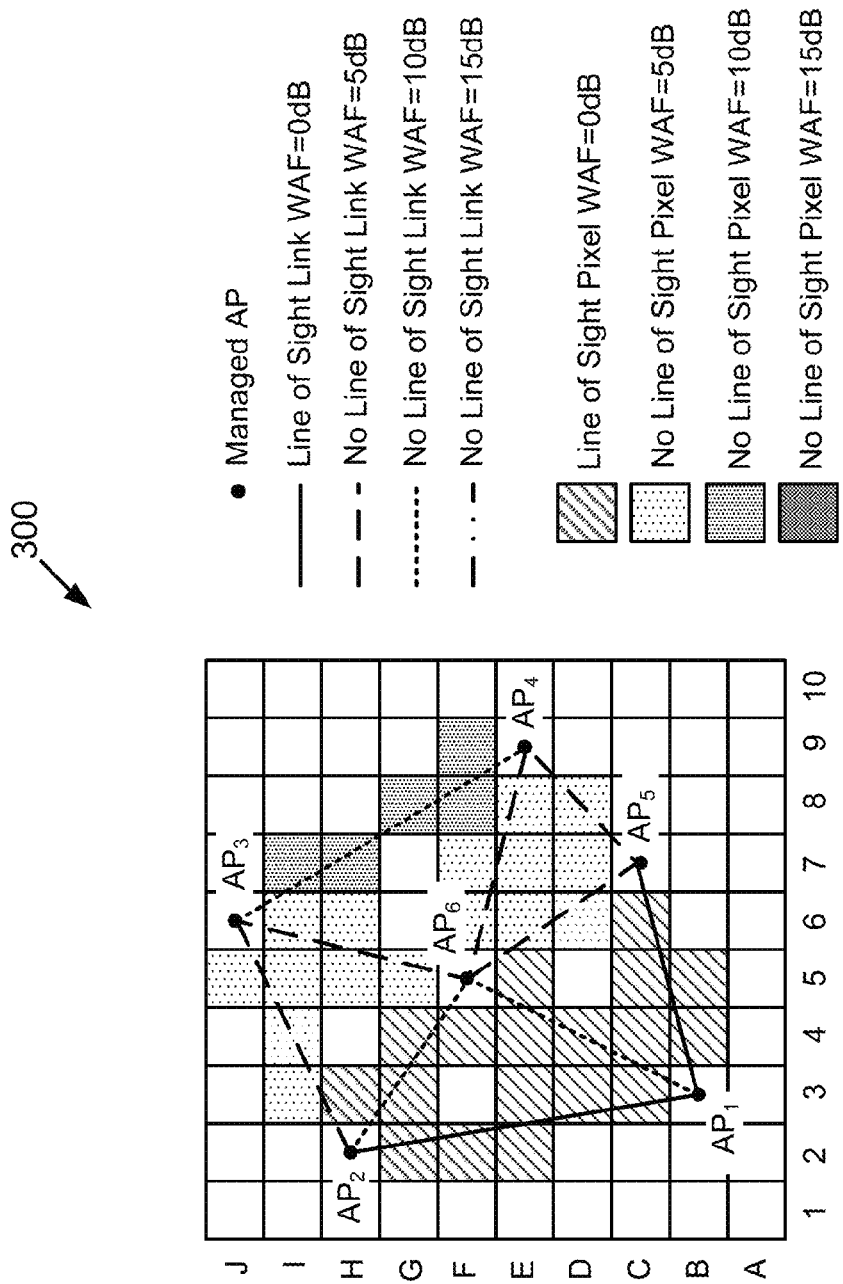
FIG. 3 illustrates an example radio map having pixels colored according to wall attenuation factors determined for straight-line paths between the plurality of located access points of FIG. 2, in accordance with some embodiments.

The determined wall attenuation factor for each straight-line path between each of $AP_1$-$AP_6$ may be used to color the pixels of radio map 300, as shown in FIG. 3. Note that as used herein, "pixel coloring" may refer to any form of customizing pixels in a radio map in order to distinguish them from other pixels. For example, the pixels of radio map 300 may be colored (e.g., using different colors such as red and green or in grayscale), shaded (e.g., with gradients of colors or greyscale), patterned (e.g., with different patterns of lines), annotated (e.g., with icons), the pixels may use different borders or patterns (e.g., hashed versus complete lines), and other forms of customization are possible as would be known by persons of skill in the art. FIG. 3 illustrates an example radio map 300 having pixels patterned according to wall attenuation factors determined for straight-line paths between the plurality of located access points of FIG. 2 ($AP_1$-$AP_6$), in accordance with some embodiments. As shown, $AP_1$ is located in pixel B3, $AP_2$ is located in pixel H2, $AP_3$ is located in pixel J6, $AP_4$ is located in pixel E9, $AP_5$ is located in pixel C7, and $AP_6$ is located in pixel F5.

FIG. 3 shows $AP_1$ having straight line paths to each of $AP_2$, $AP_5$ and $AP_6$. The straight-line path $AP_1$-to-$AP_2$ is a wall attenuation factor=0 dB path and traverses pixels C3, D3, E3, E2, F2, G2. A path with wall attenuation factor=0 dB is expected not to have any walls or similar obstructions. Thus, traversed pixels C3, D3, E3, E2, F2, G2 are shaded a first pattern corresponding to wall attenuation factor=0 dB. The straight-line path $AP_1$-to-$AP_6$ is also a wall attenuation factor=0 dB path and traverses pixels C3, C4, D4, E4, and E5. Thus, traversed pixels C3, C4, D4, E4, and E5 are also shaded the first pattern corresponding to wall attenuation factor=0 dB. The straight-line path $AP_1$-to-$AP_5$ is also a wall attenuation factor=0 dB path and traverses pixels B4, B5, C5, and C6, which are also shaded the first pattern corresponding to wall attenuation factor=0 dB.

FIG. 3 shows $AP_2$ further having straight line paths to each of $AP_3$ and $AP_6$. The straight-line path $AP_2$-to-$AP_6$ is also a wall attenuation factor=0 dB path and traverses pixels H3, G3, G4, and F4. Thus, traversed pixels H3, G3, G4, and F4 are also shaded the first pattern corresponding to wall attenuation factor=0 dB. The straight-line path $AP_2$-to-$AP_3$ is a wall attenuation factor=5 dB path and traverses pixels H3, I3, I4, I5, and J5. In some embodiments, a path with wall attenuation factor=5 dB is expected to have at least one wall or similar obstruction along the path. However, since the precise location of this assumed wall is not known in advance, each pixel along the path may be colored to indicate wall attenuation factor=5 dB with one exception. Where a pixel is traversed by more than one path, that pixel should be colored to indicate the lowest wall attenuation factor of a straight-line path that traverses that pixel. Thus, traversed pixel H3, which is also traversed by straight-line path $AP_2$-to-$AP_6$ having wall attenuation factor=0 dB, is shaded the first pattern corresponding to wall attenuation factor=0 dB, while traversed pixels I3, I4, I5, and J5 are shaded a second pattern corresponding to wall attenuation factor=5 dB.

FIG. 3 shows $AP_3$ further having straight line paths to each of $AP_4$ and $AP_6$. The straight-line path $AP_3$-to-$AP_6$ is also a wall attenuation factor=5 dB path and traverses pixels I6, H6, H5 and G5. Thus, traversed pixels I6, H6, H5 and G5 are also shaded the second pattern corresponding to wall attenuation factor=5 dB. The straight-line path $AP_3$-to-$AP_4$ is a wall attenuation factor=10 dB path and traverses pixels I6, I7, H7, G8, F8, and F9. Since traversed pixel I6 is also traversed by straight-line path $AP_3$-to-$AP_6$ having wall attenuation factor=5 dB, traversed pixel I6 is shaded the second pattern corresponding to wall attenuation factor=5 dB, while traversed pixels I7, H7, G8, F8, and F9 are shaded a third pattern corresponding to wall attenuation factor=10 dB.

FIG. 3 shows $AP_4$ further having straight line paths to each of $AP_5$ and $AP_6$. The straight-line path $AP_4$-to-$AP_6$ is also a wall attenuation factor=5 dB path and traverses pixels F6, F7, E7, and E8. Thus, traversed pixels F6, F7, E7, and E8 are also shaded the second pattern corresponding to wall attenuation factor=5 dB. The straight-line path $AP_4$-to-$AP_5$ is also a wall attenuation factor=5 dB path and traverses pixel D8. Thus, traversed pixel D8 is also shaded the second pattern corresponding to wall attenuation factor=5 dB.

FIG. 3 shows $AP_5$ further having straight line path to $AP_6$. The straight-line path $AP_5$-to-$AP_6$ is a wall attenuation factor=5 dB path and traverses pixels E5, E6, D6 and D7. Since traversed pixel E5 is also traversed by straight-line path $AP_1$-to-$AP_6$ having wall attenuation factor=0 dB, traversed pixel E5 is shaded the first pattern corresponding to wall attenuation factor=0 dB, while traversed pixels E6, D6 and D7 are shaded the second pattern corresponding to wall attenuation factor=5 dB.

Pixel coloring may be utilized in a subsequent step to rank candidate location estimates of an unlocated access point, eNodeB or other network-connected device. For the purposes of this application, the term "unlocated" as it relates to an access point, eNodeB or other network-connected device indicates, among other things, that its location is not known in advance and, thus, is subsequently estimated or determined.

In some embodiments, measurements taken from devices within the self-organizing network (e.g., especially in survey mode) may be used to refine map coloring of pixels in a radio map outside of the coloring of those pixels by straight-line paths between the located access points (e.g., $AP_1$-$AP_6$) (as described above). For example, network devices may be dedicated to collecting additional metrics (e.g., by placing them in survey mode) rather than serving any network clients.

Figure 4:
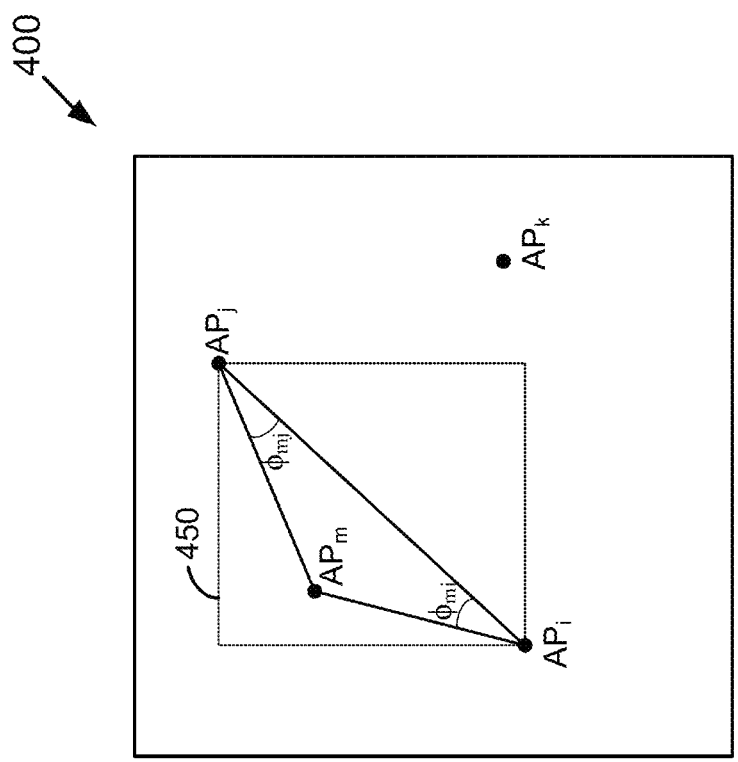
FIG. 4 illustrates an example arrangement of access points for determining adjacency, in accordance with some embodiments.

FIG. 4 illustrates an example arrangement of access points for determining adjacency, in accordance with some embodiments. FIG. 4 illustrates a floor plan boundary 400 within which $AP_i$, $AP_j$, $AP_k$ and $AP_m$ are located. Before the pixel coloring previously described in connection with FIG. 3) is performed, it should be determined whether a pair of access points (e.g., $AP_i$ and $AP_j$) are considered "adjacent". Two access points may be considered adjacent if there are no other access points on a direct line of sight path between the two access points. Where a third access point is near a line of sight path between the first two access points, an angle measure between either the first and third access point or the second and third access point may be used to determine the adjacency of the first and second access points.

In FIG. 4, an adjacency consideration window 450 is shown, having opposite corners defined by the locations of the pair of access points in question (e.g., $AP_i$ and $AP_j$). Access points not located within the adjacency consideration window 450 (e.g., $AP_k$) do not affect the adjacency determination and can be ignored. However, $AP_m$ is located within the adjacency consideration window 450. Straight lines connecting each of $AP_i$, $AP_j$ and $AP_m$ form a triangle. The angle $\phi_{mi}$ formed by the straight lines converging at $AP_i$ and the angle $\phi_{mj}$ formed by the straight lines converging at $AP_j$ are used to determine whether $AP_i$ and $AP_j$ are considered "adjacent" to each other. For example, if either of the angles $\phi_{mi}$ or $\phi_{mj}$ are less than an adjacency angle threshold (e.g., $\pi/36$ radians or 5°) $AP_i$ and $AP_j$ may not be considered "adjacent" to one another.

Figure 5:
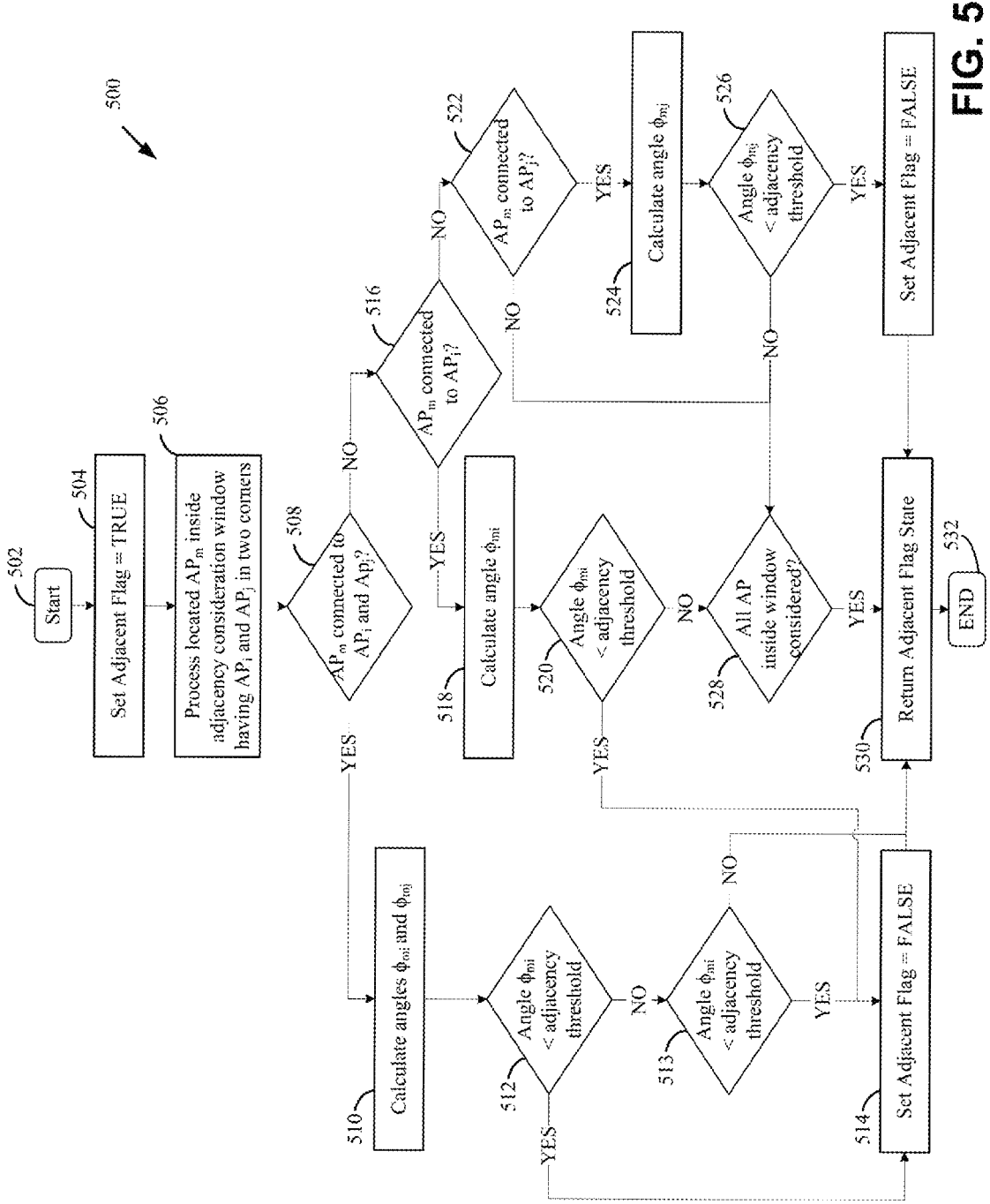
FIG. 5 illustrates a flowchart for determining adjacency of two connected access points as previously described in connection with FIG. 4, in accordance with some embodiments.

FIG. 5 illustrates a flowchart 500 for determining adjacency of two access points as previously described in connection with FIG. 4, in accordance with some embodiments. Flowchart 500 may be performed by radio map function 110 (see FIG. 1) and may begin at start block 502 for determining adjacency of a pair of access points (e.g., $AP_i$ and $AP_j$). Flowchart 500 advances to block 504, where radio map function 110 sets an adjacent flag to TRUE. Flowchart 500 advances to block 506, where radio map function 110 ensures every located access point (e.g., $AP_m$) located inside the adjacency consideration window 450 of FIG. 4 is processed.

Flowchart 500 advances to block 508, where radio map function 110 determines whether $AP_m$ is connected to both $AP_i$ and $AP_j$. If the determination is YES, flowchart 500 advances to block 510, where radio map function 110 calculates the angles $\phi_{mi}$ or $\phi_{mj}$. From block 510, flowchart 500 advances to block 512, where radio map function 110 determines whether angle $\phi_{mi}$ is less than the adjacency angle threshold. If the determination is YES, flowchart 500 advances to block 514, where radio map function 110 sets the adjacency flag of block 504 to FALSE. If the determination at block 512 is NO, flowchart 500 advances to block 513, where radio map function 110 determines whether angle $\phi_{mj}$ is less than the adjacency angle threshold. If the determination is YES, flowchart 500 advances to block 514, where radio map function 110 sets the adjacency flag of block 504 to FALSE. Flowchart 500 then advances to block 530, where radio map function 110 returns the adjacent flag in its current state. From block 530, flowchart 500 advances to end block 532.

Returning to block 508, if the determination is NO, flowchart 500 advances to block 516, where radio map function 110 determines whether $AP_m$ is connected to $AP_i$. Access points are connected if they receive communications from each other. If the determination is YES, flowchart 500 advances to block 518, where radio map function 110 calculates the angle $\phi_{mi}$. Flowchart 500 advances to block 520, where radio map function 110 determines whether the angle $\phi_{mi}$ is less than the adjacency angle threshold. If the determination is YES, flowchart 500 advances to blocks 514, 530 and then 532 as previously described. If the determination is NO, flowchart 500 advances to block 528, where radio map function 110 determines whether all located access points located within the adjacency consideration window 450 have been considered. If the determination is YES, flowchart 500 advances to block 530 and then 532 as previously described. If the determination is NO, flowchart 500 advances back to block 506.

Returning to block 516, if the determination is NO, flowchart 500 advances to block 522, where radio map function 110 determines whether $AP_m$ is connected to $AP_j$. If the determination is YES, flowchart 500 advances to block 524, where radio map function 110 calculates the angle $\phi_{mj}$. Flowchart 500 advances to block 526, where radio map function 110 determines whether the angle $\phi_{mj}$ is less than the adjacency angle threshold. If the determination is YES, flowchart 500 advances to blocks 514, 530 and then 532 as previously described. If the determination is NO, flowchart 500 advances to block 528 as previously described. Once end block 532 is reached, radio map function 110 will have determined whether the located access point pair under consideration (e.g., $AP_i$ and $AP_j$) are adjacent or not adjacent. In some other embodiments, two access points may be considered adjacent if the straight-line path between them does not cross any other line connecting any other pair of unlocated access points.

Figure 6:
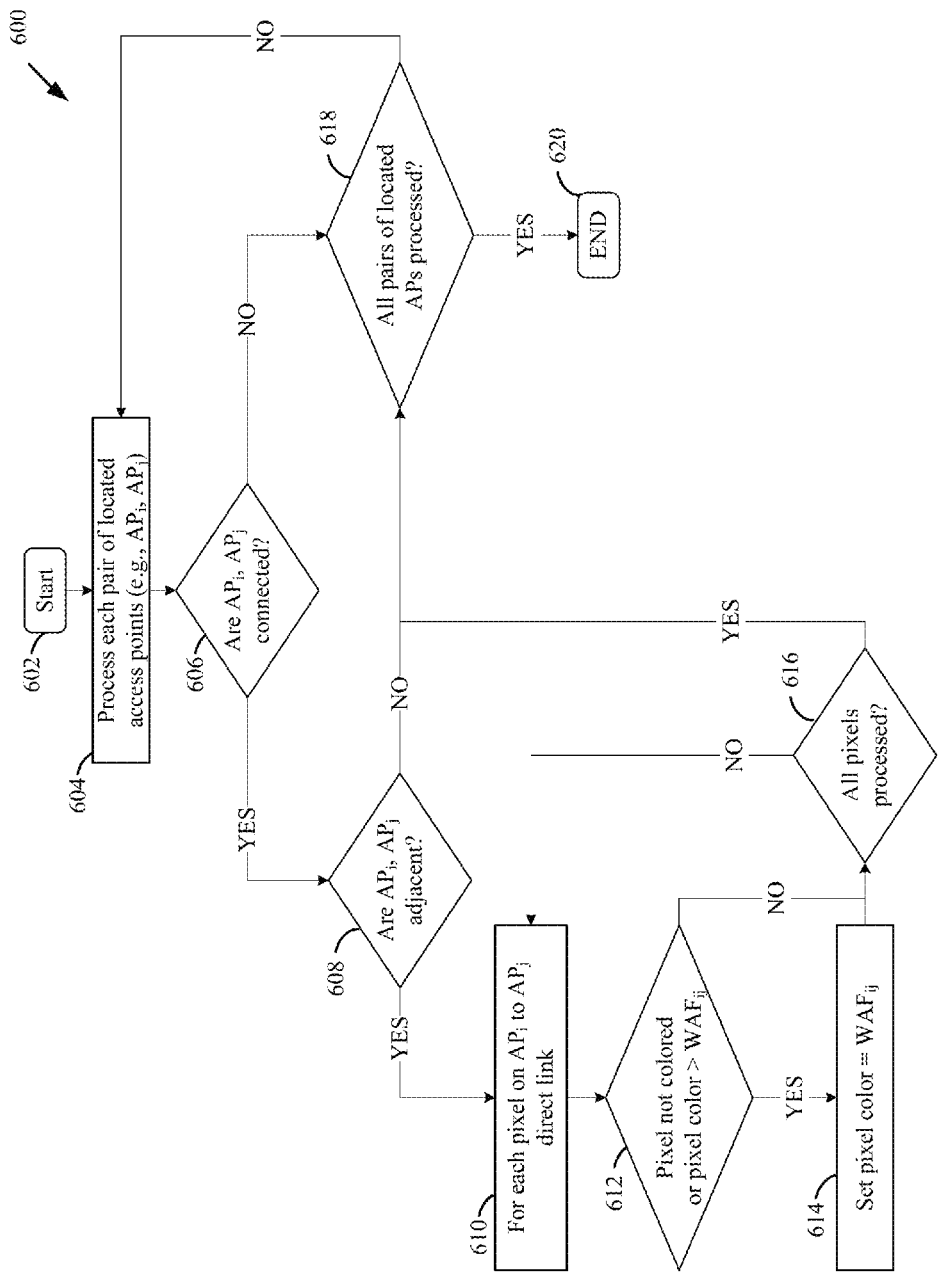
FIG. 6 illustrates a flowchart for coloring pixels in straight-line paths between adjacent located access points as previously described in connection with FIG. 3, in accordance with some embodiments.

FIG. 6 illustrates a flowchart 600 for coloring pixels in straight-line paths between adjacent located access points as previously described in connection with FIG. 3, in accordance with some embodiments. FIG. 6 may correspond to FIGS. 3-5 as previously described. Flowchart 600 may begin at start block 602. Flowchart 600 advances to block 604, where radio map function 110 processes each pair of located access points (e.g., $AP_i$, $AP_j$). Flowchart 600 advances to block 606, where radio map function 110 determines whether $AP_i$ and $AP_j$ are connected. As noted above, access points are connected if they receive communications from each other. If the determination is YES, flowchart 600 advances to block 608. If the determination is NO, flowchart 600 advances to block 618, where radio map function 110 ensures all pairs of located access points have been processed. If the determination is YES, flowchart 600 advances to end block 620. If the determination is NO, flowchart 600 advances back to block 604.

Returning to block 608, radio map function 110 determines whether the current pair of access points (e.g., $AP_i$ and $AP_j$) are adjacent to one another. This determination may be carried out as previously described in connection with FIGS. 4 and 5. If the determination is NO, flowchart 600 advances to block 618 as previously described. If the determination is YES, flowchart 600 advances to block 610, where radio map function 110 processes each pixel on the straight-line path for coloring according to blocks 612, 614, and 616. Flowchart 600 advances to block 612, where radio map function 110 determines whether the current pixel is either not colored or colored with a color associated with a larger wall attenuation factor than the determined wall attenuation factor for the straight-line path between the currently considered pair of access points. If the determination is YES, flowchart 600 advances to block 614, where radio map function 110 colors the pixel with the color associated with the determined wall attenuation factor for the straight-line path between the currently considered pair of access points. From block 614 or if the determination at block 612 is NO, flowchart 600 advances to block 616 where radio map function 110 determines whether all pixels on the straight-line path between the currently considered pair of access points have been processed. If the determination is YES, flowchart 600 advances to block 618 as previously described. If the determination is NO, flowchart 600 advances back to block 610. Note, in this embodiment, the pixels are customized by coloring. However, as described above, in other embodiments the pixels may be customized by shading, patterning, or other manipulations that allow individual pixels to be distinguishable from other individual pixels based on, for example, estimated wall attenuation factor at that pixel.

Utilizing flowchart 600 of FIG. 6, radio map function 110 may color pixels on the straight-line paths between adjacent located access points as previously described in connection with FIG. 3. If the color associated with the lowest wall attenuation factor of multiple links crossing a pixel is automatically selected, it may be possible to bypass the adjacency test previously described in connection with FIGS. 4 and 5. In such embodiments, flowchart 600 may not include block 608 and a YES determination at block 606 would advance directly to block 610. All other functionality of flowchart 600 would remain unchanged.

Once radio map function 110 has assigned a pixel for each of the located access points (e.g., $AP_1$-$AP_6$) (see FIG. 2) and the pixels traversed on the straight-line paths connecting adjacent pairs of the located access points have been colored (see FIGS. 3-6), radio map function 110 may determine a list of candidate location estimates for one or more unlocated devices (e.g., either unlocated access points or devices unable to determine indoor location). For an unlocated access point, it may be assumed that at least three of the located access points (e.g., $AP_1$-$AP_6$) receive a signal or communication from the unlocated access point from which a received signal strength (RSS) may be determined. For unlocated devices that are not access points, it may be assumed that the unlocated device receives beacons, signals or communications from three or more of the located access points (e.g., $AP_1$-$AP_6$) from which RSS may be determined. These RSS values may be sorted from highest to lowest and at least the three highest RSS values may be utilized to determine candidate location estimates for the unlocated device as will be described in more detail in connection with FIG. 7 below.

Figure 7:
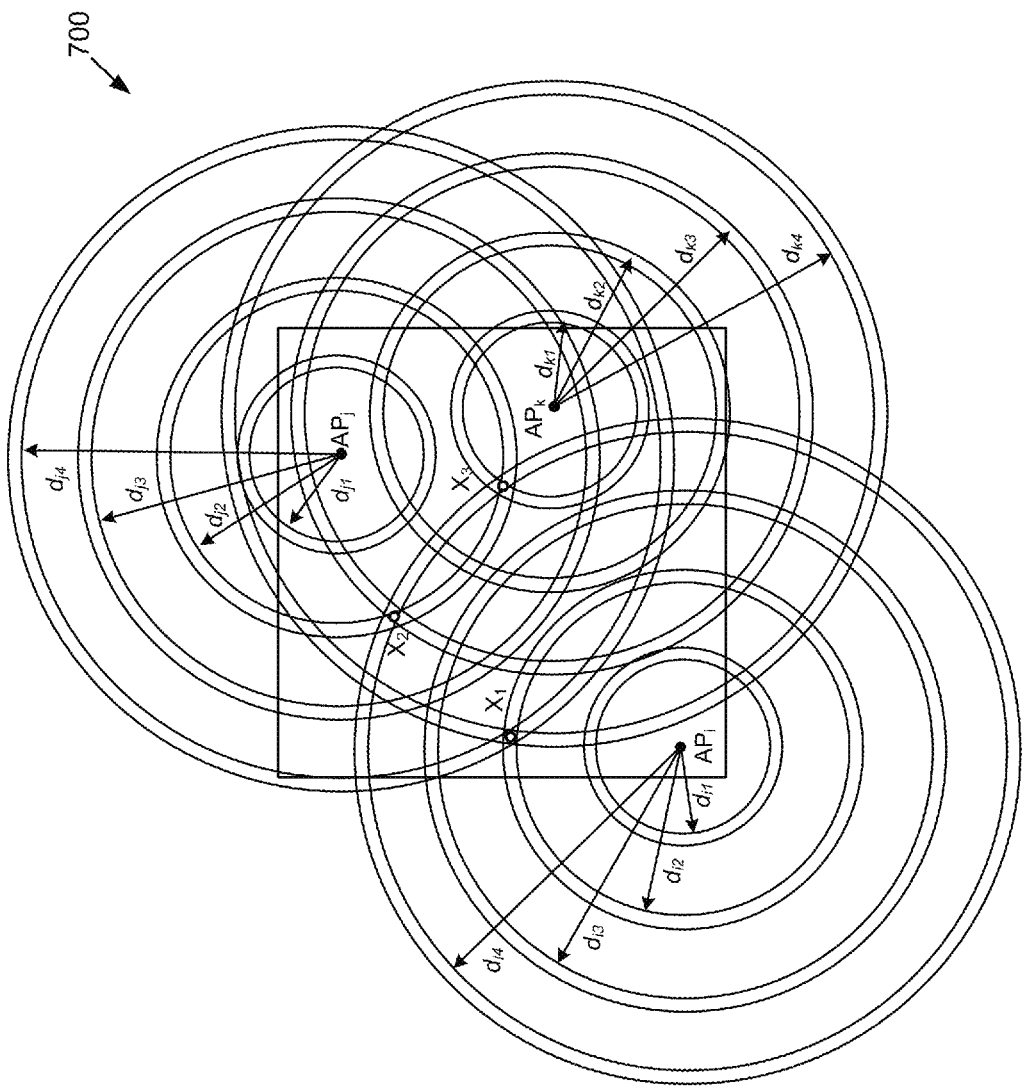
FIG. 7 is an exemplary diagram illustrating a plurality of candidate location estimates for an unlocated device, in accordance with some embodiments.

FIG. 7 is an exemplary diagram 700 illustrating a plurality of candidate location estimates $X_1$, $X_2$, $X_3$ for an unlocated device, in accordance with some embodiments. $AP_i$, $AP_j$ and $AP_k$ may correspond to three located access points associated with the highest RSS values of the located access points (e.g., $AP_1$-$AP_6$) for a particular unlocated device. For example, where the unlocated device is an access point, $AP_i$, $AP_j$ and $AP_k$ are the located access points at which a received signal from the unlocated access point has the highest RSS of the located access points (e.g., $AP_1$-$AP_6$). Where the unlocated device is not an access point, signals received from $AP_i$, $AP_j$ and $AP_k$ by the unlocated device have the highest RSS values of the located access points (e.g., $AP_1$-$AP_6$).

Regardless of the type of unlocated device, radio map function 110 may determine straight-line path distances ($d_{i-k,1-4}$) between the unlocated device and each of $AP_i$, $AP_j$ and $AP_k$ for each of a plurality of wall attenuation factor values (e.g., 0 dB, 5 dB, 10 dB and 15 dB) utilizing EQs. 1 and 2. Such a determination may be based at least in part on the RSS of the received signals where those signals were transmitted from their source(s) with a known power or signal strength. For example, radio map function 110 may determine distances $d_{i1}$, $d_{i2}$, $d_{i3}$, and for $AP_i$, corresponding to wall attenuation factor values 15 dB, 10 dB, 5 dB and 0 dB, respectively; radio map function 110 may determine distances $d_{j1}$, $d_{j2}$, $d_{j3}$, and $d_{j4}$ for $AP_j$, corresponding to wall attenuation factor values 15 dB, 10 dB, 5 dB and 0 dB, respectively; and radio map function 110 may determine distances $d_{k1}$, $d_{k2}$, $d_{k3}$, and $d_{k4}$ for $AP_k$, corresponding to wall attenuation factor values 15 dB, 10 dB, 5 dB and 0 dB, respectively. Radio map function 110 may utilize each distance to define a respective estimated location region bounded by concentric circles having radii equal to the distance plus and/or minus some value(s) (e.g., estimated error values). Thus, the estimated location regions may take the form of concentric rings centered at the associated located access point.

Since radio map function 110 determines each distance based at least in part on a signal either received at or from the same unlocated device, radio map function 110 may determine the candidate location estimates (e.g., $X_1$, $X_2$, $X_3$) at locations where at least one estimated location region from each of $AP_i$, $AP_j$, and $AP_k$ overlap. For example, $X_1$ is located at the overlap of estimated location regions defined by $d_{i2}$, $d_{j4}$, and $d_{k4}$; $X_2$ is located at the overlap of estimated location regions defined by $d_{i4}$, $d_{j2}$, and $d_{k1}$; and $X_3$ is located at the overlap of estimated location regions defined by $d_{i4}$, $d_{j2}$, and $d_{k1}$. As shown, although the theoretical maximum number of candidate location estimates is $4^3=64$ (4 distances from each of 3 access points), the above-described overlap requirement of associated estimated location regions generally reduces the candidate location estimates to a much smaller set (e.g., three in this example: $X_1$, $X_2$, $X_3$).

These distances may be overestimated or underestimated such that an estimated location region from each located access point do not overlap. In such circumstances, adjustment of the estimated distances may be desired, as will be described with reference to FIGS. 8A and 8B.

Figure 8B:
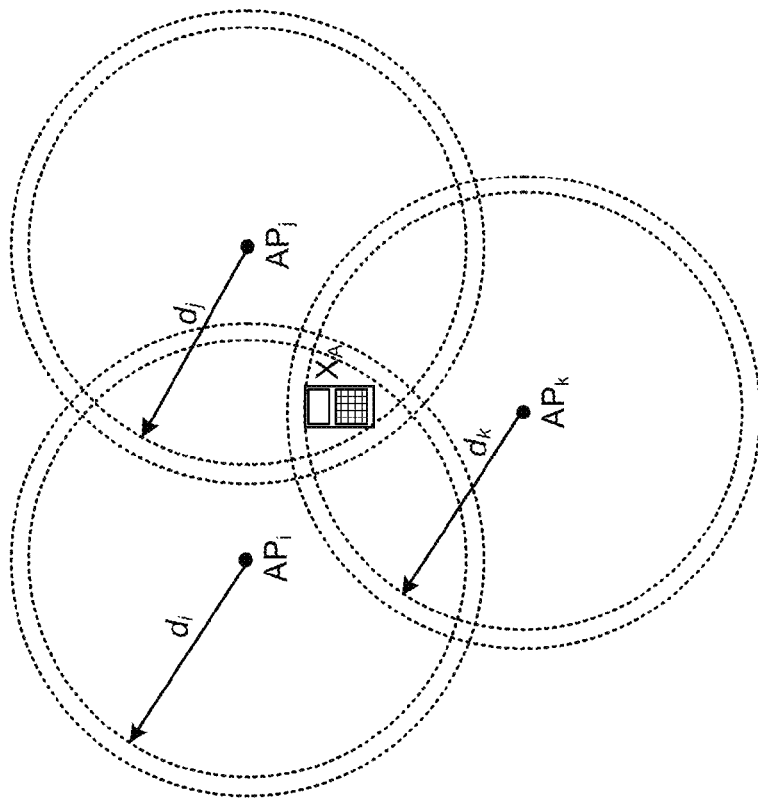
FIG. 8B illustrates estimated location regions that do not overlap due to overestimated distances (e.g., underestimated path loss and/or wall attenuation factor), in accordance with some embodiments.
Figure 8A:
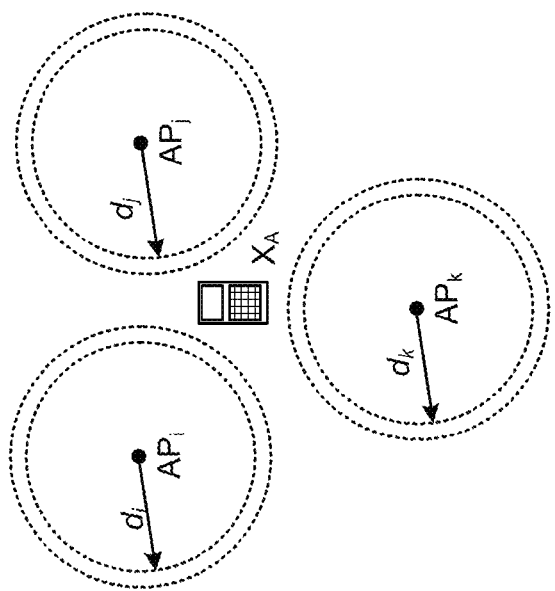
FIG. 8A illustrates estimated location regions that do not overlap due to underestimated distances (e.g., overestimated path loss and/or wall attenuation factor), in accordance with some embodiments.

FIG. 8A illustrates estimated location regions that do not overlap due to underestimated distances (e.g., overestimated path loss and/or wall attenuation factor), in accordance with some embodiments. A first estimated location region may be defined by the distance $d_i$ measured from $AP_i$, a second estimated location region may be defined by the distance $d_j$ measured from $AP_j$, and a third estimated location region may be defined by the distance $d_k$ measured from $AP_k$. Since distances $d_i$, $d_j$, and $d_k$ are underestimated, their associated estimated location regions do not extend to the actual location of unlocated device $X_A$ and do not overlap at all. In such a circumstance, it may be desirable to adjust the estimated distances $d_i$, $d_j$, and $d_k$ to larger values.

FIG. 8B illustrates estimated location regions wherein all three distance estimates do not overlap at any single point due to overestimated distances (e.g., underestimated path loss and/or wall attenuation factor), in accordance with some embodiments. Since distances $d_i$, $d_j$, and $d_k$ are overestimated in FIG. 8B, their associated estimated location regions extend beyond the actual location of unlocated device $X_A$ and do not all overlap at any single location. In such a circumstance, it may be desirable to adjust the estimated distances $d_i$, $d_j$ and $d_k$ to smaller values.

Figure 9:
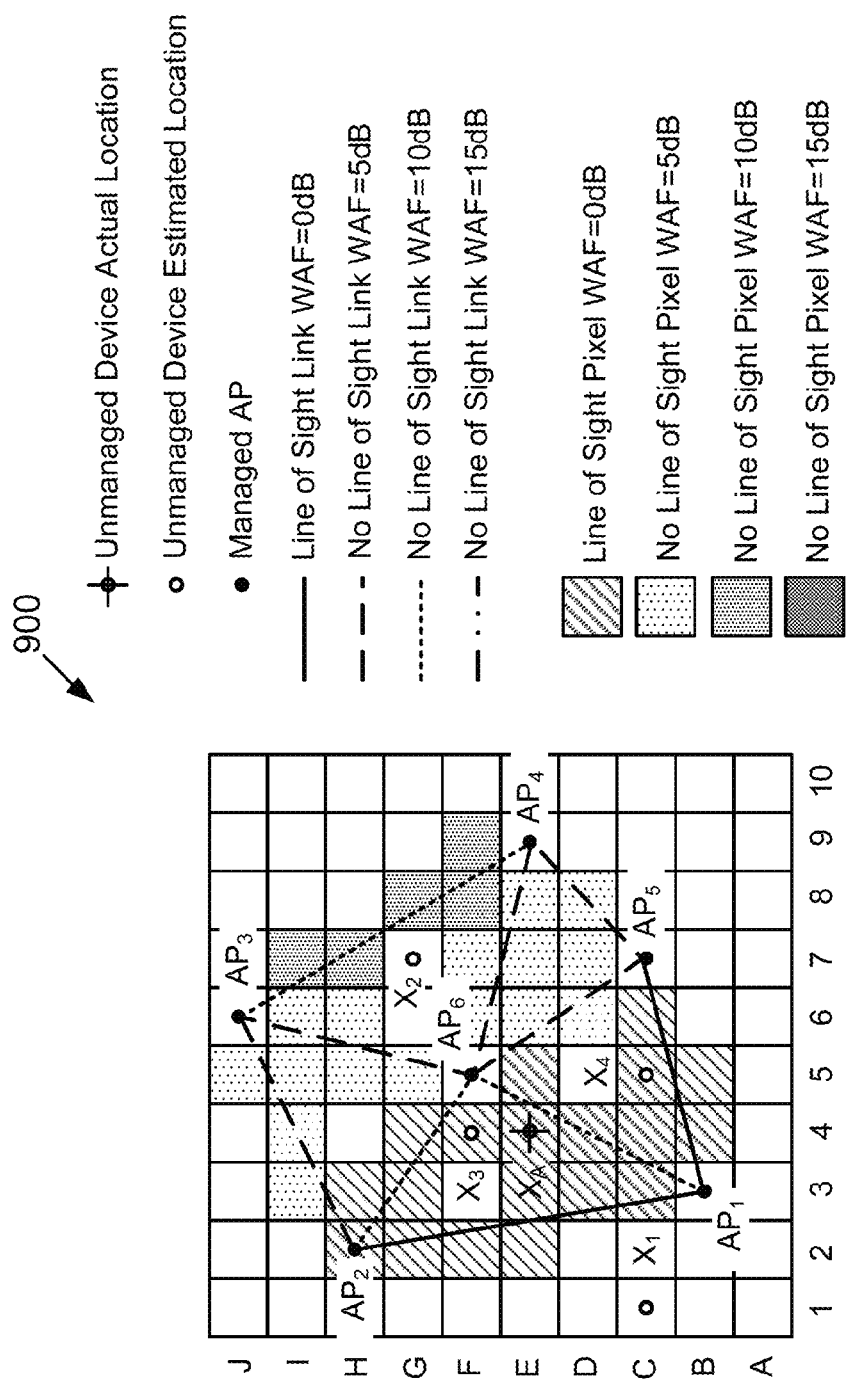
FIG. 9 illustrates an example radio map showing the plurality of located access points, colored pixels, and a plurality of candidate location estimates for an unlocated device, in accordance with some embodiments.

FIG. 9 illustrates an example radio map 900 showing the plurality of located access points, colored pixels (here, by patterning), and a plurality of candidate location estimates $X_1$, $X_2$, $X_3$, $X_4$ for an unlocated device, in accordance with some embodiments. The candidate location estimates $X_1$, $X_2$, $X_3$, $X_4$ are shown in pixels C1, G7, F4 and C5, respectively, and may be determined as previously described in connection with FIGS. 7, 8A and 8B. The actual location $X_A$ of the unlocated device is also shown in pixel E4 for reference, however, radio map function 110 (see FIG. 1) may not have access to this actual location. Once the plurality of candidate location estimates have been determined, the map coloring information (see also FIG. 3) may be utilized to determine a likelihood value for each candidate location estimate. The candidate location estimates may be ranked from highest to lowest likelihood value and the candidate location estimate having the highest likelihood value may be selected as the single location of the unlocated device. The process utilized to determine the likelihood values is referred to as "trilateration" and will be described in more detail below.

Figure 10:
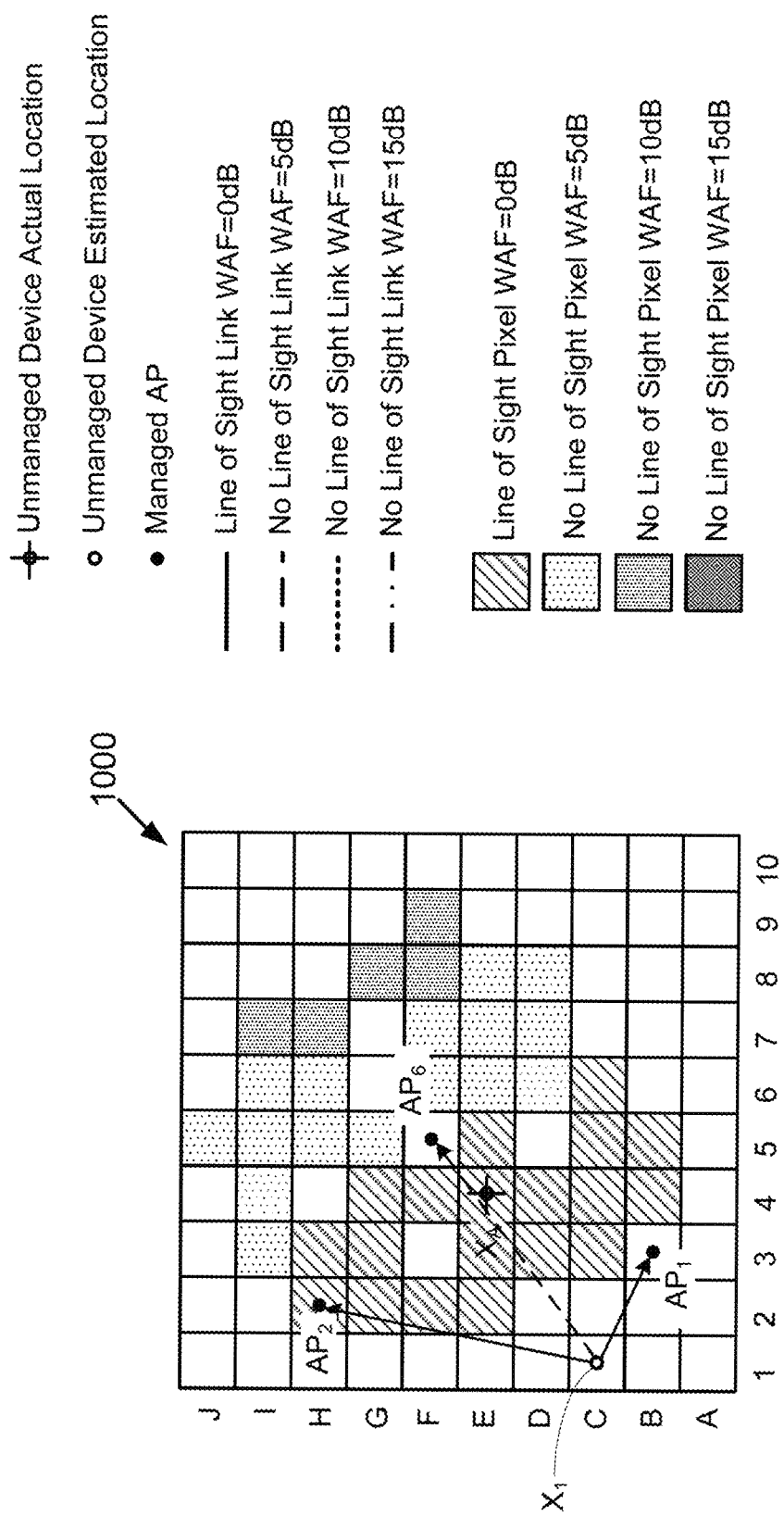
FIG. 10 illustrates an example radio map showing the plurality of located access points, colored pixels, one of the plurality of candidate location estimates for an unlocated device for use in a trilateration process, in accordance with some embodiments.

FIG. 10 illustrates an example radio map 1000 showing the plurality of located access points, colored pixels, and one of the plurality of candidate location estimates for an unlocated device for use in a trilateration process, in accordance with some embodiments. Radio map 1000 may be substantially the same as radio map 900 shown in FIG. 9, however, FIG. 10 depicts only the three located access points having the greatest RSS as previously described (e.g., $AP_1$, $AP_2$, $AP_6$), only one of the candidate location estimates (e.g., $X_1$), and straight-line paths from $X_1$ to each of $AP_1$, $AP_2$, $AP_6$. Each pixel along each path indicates the wall attenuation factor associated with the distance used to estimate the location $X_1$ (see FIG. 7).

For example, a straight-line path from $X_1$ to $AP_1$ indicates wall attenuation factor=0 dB, a straight-line path from $X_1$ to $AP_2$ indicates wall attenuation factor=0 dB, and a straight-line path from $X_1$ to $AP_6$ indicates wall attenuation factor=5 dB. For each straight-line path between $X_1$ and each of $AP_1$, $AP_2$, $AP_6$ a link delta coefficient $\delta_k$ may be calculated to indicate a difference between the link wall attenuation factor of the straight-line path and the color of the pixels traversed by the straight-line path (e.g., the wall attenuation factor assigned to pixels between located access points), according to EQs. 3 and 4.

$$\delta_k = \frac{1}{Nk}\sum_{i=1}^{Nk} \text{pixel\_diff}_{ki}, 1 \le k \le 3 \qquad \text{EQ. 3}$$

In EQ. 3, above, $N_k$ is the number of pixels crossed by the straight-line path between the candidate location estimate and the located $AP_k$, and where:

$$\text{pixel\_diff}_{ki} = \begin{cases} \frac{|\text{link\_waf}_k - \text{pixel\_waf}_i|}{15}, & \text{if pixel } i \text{ is colored} \\ 0.5, & \text{if pixel } i \text{ is not colored} \\ 0.8, & \text{if pixel } i \text{ is outside floorplan} \end{cases} \qquad \text{EQ. 4}$$

In EQ. 4, above, $\text{link\_WAF}_k$ is the wall attenuation factor of the straight-line path between the candidate location estimate and the located $AP_k$, $\text{pixel\_WAF}_i$ is the wall attenuation factor associated with the color of the pixel traversed by the straight-line between the candidate location estimate and the located $AP_k$. Possible values of the per-pixel difference $\text{pixel\_diff}_{ki}$ are 0, ⅓, ⅔, or 1 if the pixel is already colored, 0 being a precise match between pixel color (e.g., wall attenuation factor) and straight-line path wall attenuation factor and 1 being the highest degree of mismatch between pixel color (e.g., wall attenuation factor) and straight-line path wall attenuation factor. Possible values for the link delta coefficient $\delta_k$ are between 0 and 1.

Once the link delta coefficient $\delta_k$ has been calculated for each straight-line path between the candidate location estimate and the three located access points ($AP_1$, $AP_2$, $AP_6$) having the highest RSS, a likelihood value for each candidate location likelihood estimate (e.g., accuracy value) may be determined based at least in part on EQ. 5.

$$\text{location likelihood} = \Sigma_{k=1}^{3} w_k(1-\delta_k) \qquad \text{EQ. 5:}$$

In EQ. 5, above, $w_k$ is a weight factor associated with links k=1, 2, 3 calculated according to EQ. 6 below as a harmonic mean of the cube distance to each access point such that the link corresponding to the strongest RSS (e.g., the link traversing the shortest distance) is given the highest weight and such that the sum of all 3 weight factors $w_k$ is 1. This ensures the values of EQ. 5 remain between 0 and 1, approaching 1 as each link delta coefficient $\delta_k$ approaches 0.

$$w_k = \frac{\frac{1}{d_k^3}}{\frac{1}{d_1^3} + \frac{1}{d_2^3} + \frac{1}{d_3^3}}, 1 \le k \le 3 \qquad \text{EQ. 6}$$

In EQ. 6, above, $d_k^3$ is the cube of the straight-line distance of the path between the current candidate location estimate and the current located access point, $d_1^3$, $d_2^3$, $d_3^3$ are the cubes of the straight-line distances of the paths between the current candidate location estimate and a first, second, and third of the three located access points used for determining the current estimated position (here, $AP_1$, $AP_2$, $AP_6$), respectively.

For example, looking at radio map 1000, the straight-line path between $X_1$ and $AP_1$ traverses pixels C2 and B2 with a link wall attenuation factor=0 dB. Since pixels C2 and B2 are not colored, pixel_diff is 0.5 for each and link delta coefficient $\delta_k$ between $X_1$ and $AP_1$ is 0.5.

The straight-line path between $X_1$ and $AP_2$ traverses pixels D1, E1, F2, and G2 with link wall attenuation factor=0 dB. Since pixels D1 and E1 are not colored, pixel_diff is 0.5 for each. Pixels F2 and G2 are colored 0 dB and link wall attenuation factor=0 dB, thus pixel_diff is 0 for each and link delta coefficient $\delta_k$ between $X_1$ and $AP_2$ is 0.25.

The straight-line path between $X_1$ and $AP_6$ traverses pixels C2, D2, D3, E3, D4 and F4 with link wall attenuation factor=5 dB. Since pixels C2 and D2 are not colored, pixel_diff is 0.5 for each. Pixels D3, E3, D4 and F4 are colored 0 dB and link wall attenuation factor=5 dB, thus pixel_diff is ⅓ for each and link delta coefficient $\delta_k$ between $X_1$ and $AP_6$ is ⅓ or 0.33. These three values for δk may be input to EQ. 5 along with respective weight factors $w_k$ calculated from EQ. 6 to determine the location likelihood for location estimate $X_1$.

The process described in connection with FIG. 10 may be performed for each candidate location estimate (e.g., $X_1$, $X_2$, $X_3$, and $X_4$). Each candidate location estimate may then be ranked from highest to lowest location likelihood. The candidate location estimate having the highest location likelihood may be selected as the location of the unlocated device. This is one embodiment of a trilateration process.

In accordance with some embodiments, another, smart trilateration process may be utilized for determining the location of the unlocated device, as will be described in connection with FIGS. 10 and 11. Smart trilateration may comprise carrying out trilateration as previously described in connection with FIG. 10 utilizing the three located access points having the highest RSS as previously described (e.g., $AP_1$, $AP_2$, $AP_6$). However, rather than selecting the location of the unlocated device based at least in part on the highest location likelihood determined utilizing only the three located access points having the greatest RSS, another trilateration may be performed utilizing a different set of located access points, for example, three of the four located access points having the highest RSS. For example, where $AP_1$, $AP_2$, $AP_6$ may be the three located access points having the greatest RSS, $AP_5$ may be the located access point having the fourth greatest RSS (e.g., the greatest RSS after $AP_1$, $AP_2$, $AP_6$). Thus, trilateration may be repeated as previously described in connection with FIGS. 7, 9 and 10, except substituting $AP_5$ for one of $AP_1$, $AP_2$, $AP_6$ (e.g., utilizing $AP_1$, $AP_5$ and $AP_6$).

Figure 11:
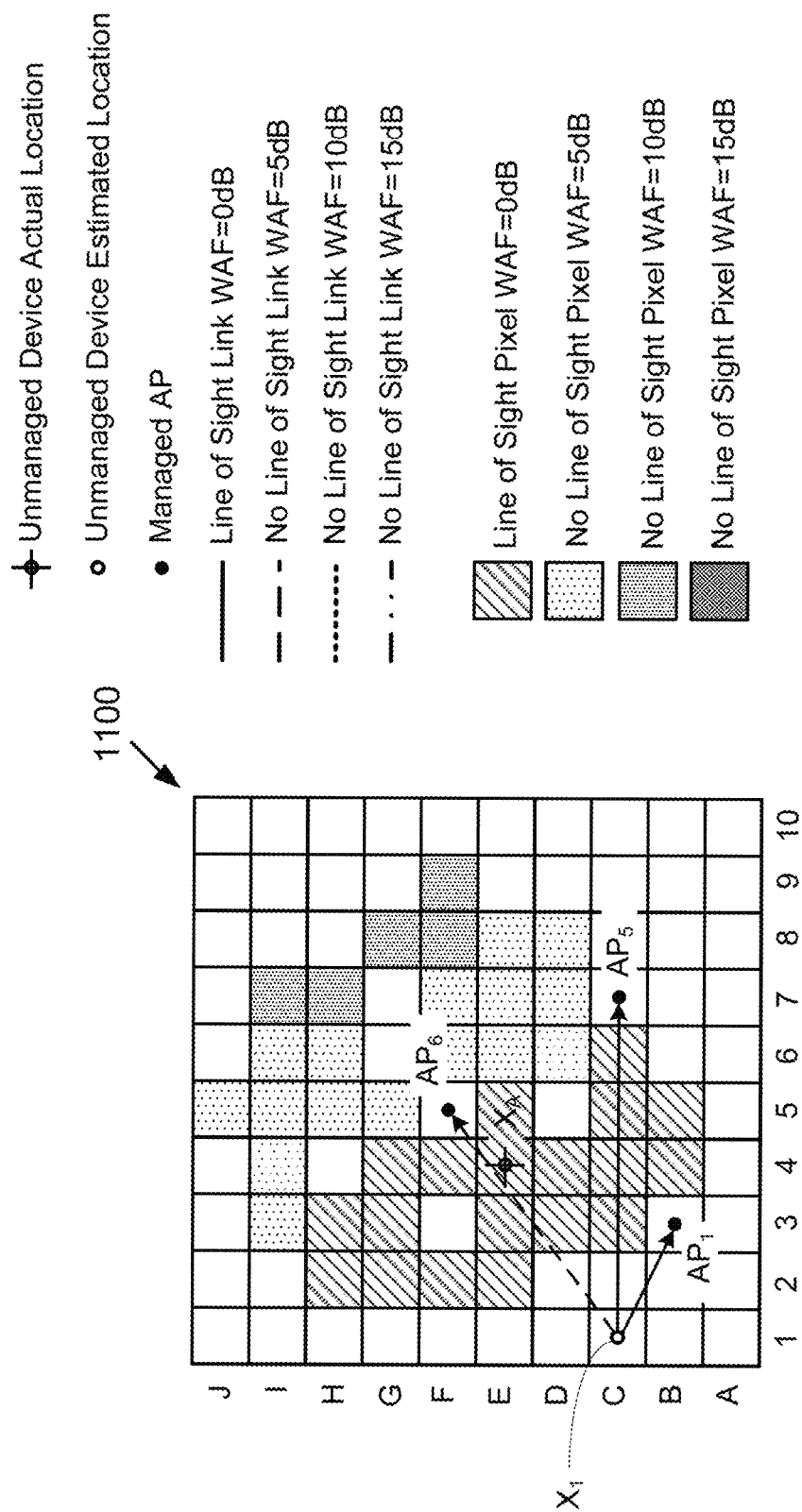
FIG. 11 illustrates another example radio map function showing the plurality of located access points, colored pixels, one of the plurality of candidate location estimates for an unlocated device for use in smart trilateration, in accordance with some embodiments.

FIG. 11 illustrates another example radio map function 1100 showing a plurality of located access points, colored pixels (here again, by patterning), one of the plurality of candidate location estimates for an unlocated device for use in smart trilateration, in accordance with some embodiments. Radio map function 1100 may be substantially the same as shown in FIG. 10, however, illustrating three of the four located access points having the greatest RSS as previously described (e.g., $AP_1$, $AP_5$, $AP_6$) and showing straight-line paths from $X_1$ to each of $AP_1$, $AP_5$, $AP_6$. Each path indicates the wall attenuation factor associated with the distance used to estimate the location $X_1$ (see FIG. 7).

Where the same pixel is determined as a candidate location estimate $X_1$ in utilizing, e.g., $AP_1$, $AP_5$, $AP_6$, rather than, e.g., $AP_1$, $AP_2$, $AP_6$ (see FIG. 7), the straight-line paths and link delta coefficients $\delta_k$ between $X_1$ and each of $AP_1$ and $AP_6$ may be as previously described in connection with FIG. 10. Thus, in some embodiments reusing two of the three located access points (e.g., $AP_1$, $AP_6$) from the first trilateration in the second trilateration may reduce calculation load if previously calculated link delta coefficients $\delta_k$ associated with those two located access points are the same and are reused.

In FIG. 11, the straight-line path between $X_1$ and $AP_5$ traverses pixels C2, C3, C4, C5 and C6 with link wall attenuation factor=0 dB. Since pixel C2 is not colored, pixel_diff is 0.5 for C2. Pixels C3, C4, C5 and C6 are colored 0 dB and link wall attenuation factor=0 dB, thus pixel_diff is 0 for each and link delta coefficient $\delta_k$ between $X_1$ and $AP_5$ is 0.1. These 3 values for $\delta k$ may be input to EQ. 5 along with respective weight factors $w_k$ calculated from EQ. 6 to determine the location likelihood for candidate location estimate $X_1$ based at least in part on $AP_1$, $AP_5$, and $AP_6$. This process may be repeated for each candidate location estimate. The location likelihoods for each candidate location estimate determined utilizing the first set of located access points (e.g., $AP_1$, $AP_2$, $AP_6$) and utilizing the second set of located access points (e.g., $AP_1$, $AP_5$, $AP_6$) may be ranked for selection of the location of the unlocated device as previously described in connection with FIG. 10.

In some other embodiments, candidate location estimates that are generated by the first trilateration (e.g., utilizing $AP_1$, $AP_2$, $AP_6$) and by the second trilateration (e.g., utilizing $AP_1$, $AP_5$, $AP_6$) may be retained, while candidate location estimates not common to both trilaterations may be eliminated. Where more than one candidate location estimate remains after such elimination, historical data for the location of the unlocated device may be utilized to select a single location where such historical data is available.

Figure 12:
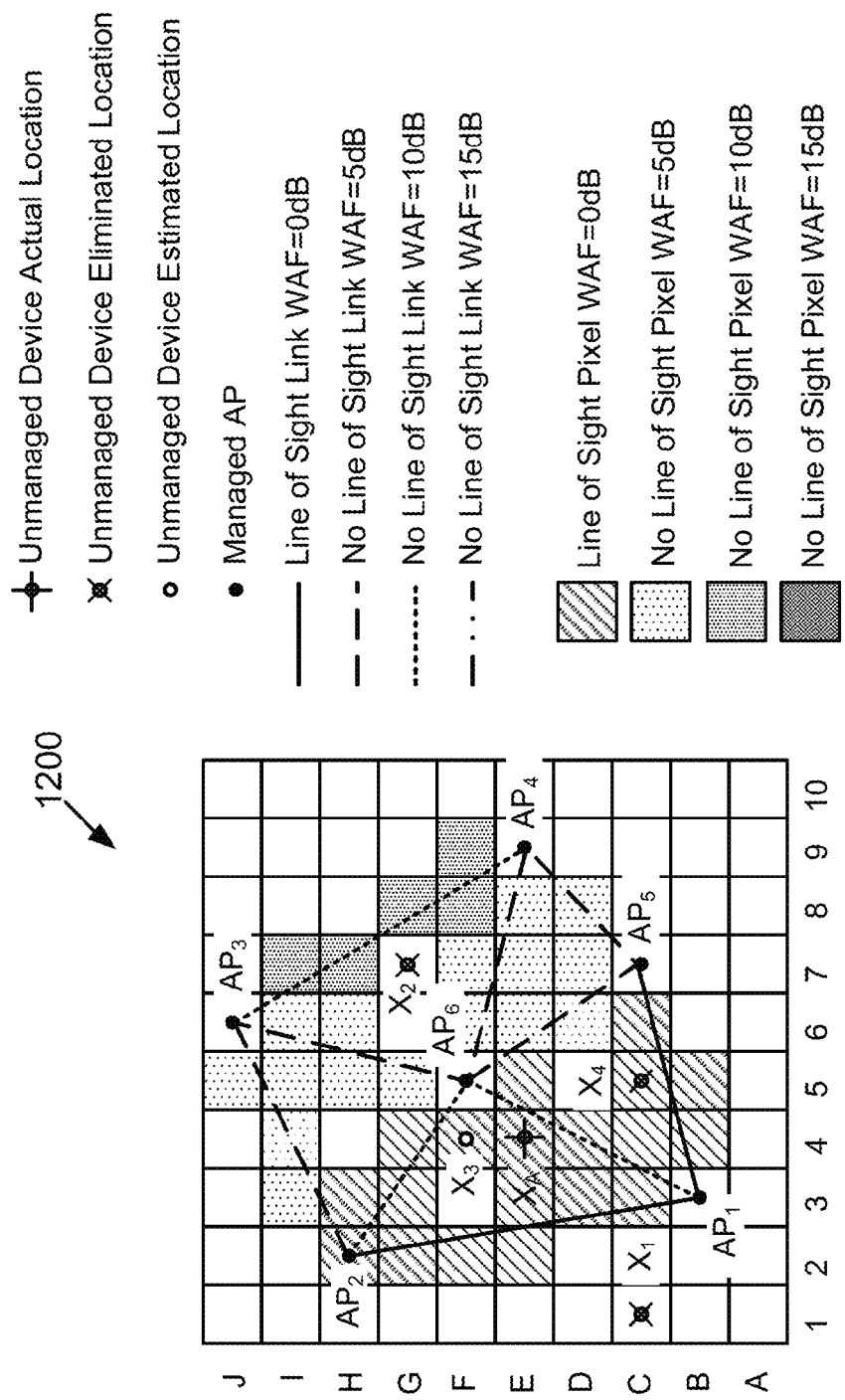
FIG. 12 illustrates an example radio map showing the plurality of located access points, colored pixels, the selected location estimate for the unlocated device, and a plurality of eliminated candidate location estimates for the unlocated device, in accordance with some embodiments.

Once a single location is selected as described above, the other candidate location estimates may be eliminated. FIG. 12 illustrates an example radio map 1200 showing the plurality of located access points, colored pixels, the selected location estimate $X_3$ for the unlocated device, and a plurality of eliminated candidate location estimates $X_1$, $X_2$, $X_4$ for the unlocated device, in accordance with some embodiments. Radio map 1200 may be substantially the same as radio map 900 of FIG. 9, however, indicating candidate location estimate $X_3$ as the selected candidate location estimate for the unlocated device, and candidate location estimates $X_1$, $X_2$, $X_4$ as eliminated candidate location estimates for the unlocated device. As described herein, a path loss model may be understood to comprise one or more components of the radio maps as previously described in connection with FIGS. 2-12. For example, one or more of pixel locations of devices, wall attenuation factor and/or distance of straight-line paths between devices, colored pixels corresponding to a wall attenuation factor of at least one traversing straight-line path, link delta coefficients $\delta k$, per-pixel difference values, location likelihoods, or weight factors associated with a particular link or location, pixel matrix size, or pixel size may be considered a portion of a path loss model.

The size and/or number of pixels that form a radio map may also be dynamically adjusted. For example, the use of a high resolution pixel matrix for map coloring may result in many uncolored pixels, which may result in lower values of the likelihood factors for the candidate location estimates. On the other hand, the use of a low resolution pixel matrix for map coloring may result in many candidate location estimate having very similar likelihood factors, which will make it more difficult to accurately select the most likely candidate.

Figure 13:
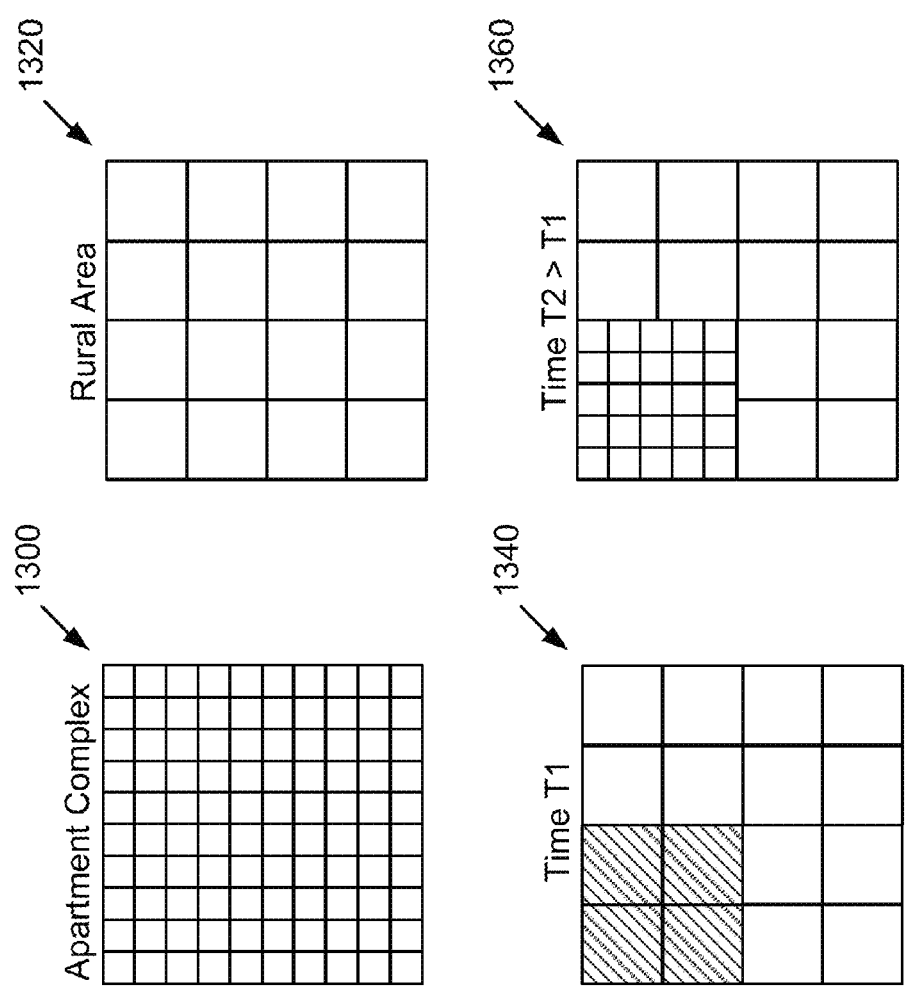
FIG. 13 illustrates a plurality of radio maps having varying pixel sizes, in accordance with some embodiments.

FIG. 13 illustrates a plurality of radio maps 1300, 1320, 1340, 1360 having varying pixel sizes, in accordance with some embodiments. The pixel size in a radio map may be different depending on the observed or expected signal traffic in an area or alternatively based at least in part on the requirements of RRM 140 (see FIG. 1) in that area. For example, a radio map 1300 associated with an apartment complex may have smaller pixels than a radio map 1320 associated with a rural area because observed or expected signal traffic is greater per unit area in an apartment complex than in a rural area.

In some embodiments, the size of pixels in a radio map may be changed dynamically based at least in part on a number of measurements collected in a given area within a given interval of time. For example, radio 1340 may have a plurality of pixels having a first size at a time T1. The shaded pixels may indicate locations where an increased number of ongoing measurements are being collected compared, for example, to the unshaded pixels in radio map 1340. Radio map 1360 may indicate radio map 1340 at a time T2 after T1. Based at least in part on the number of recent measurements collected in the shaded pixels of radio map 1340, the size of those shaded pixels may be decreased and the number increased to cover the same area, as shown by radio map 1360. In some embodiments, the size of the pixels in each area of a radio map may be communicated to functions that utilize the radio map data (e.g., RRM function 140 of FIG. 1, display functions of one or more devices associated with the self-organizing network described by radio map, etc.).

In some embodiments, RRM 140 may work in concert with radio map function 110 and network devices 152, 154, 156 (see FIG. 1) to dynamically manage the self-organizing network based at least in part on the occurrence of a particular event associated with a radio map.

Figure 14:
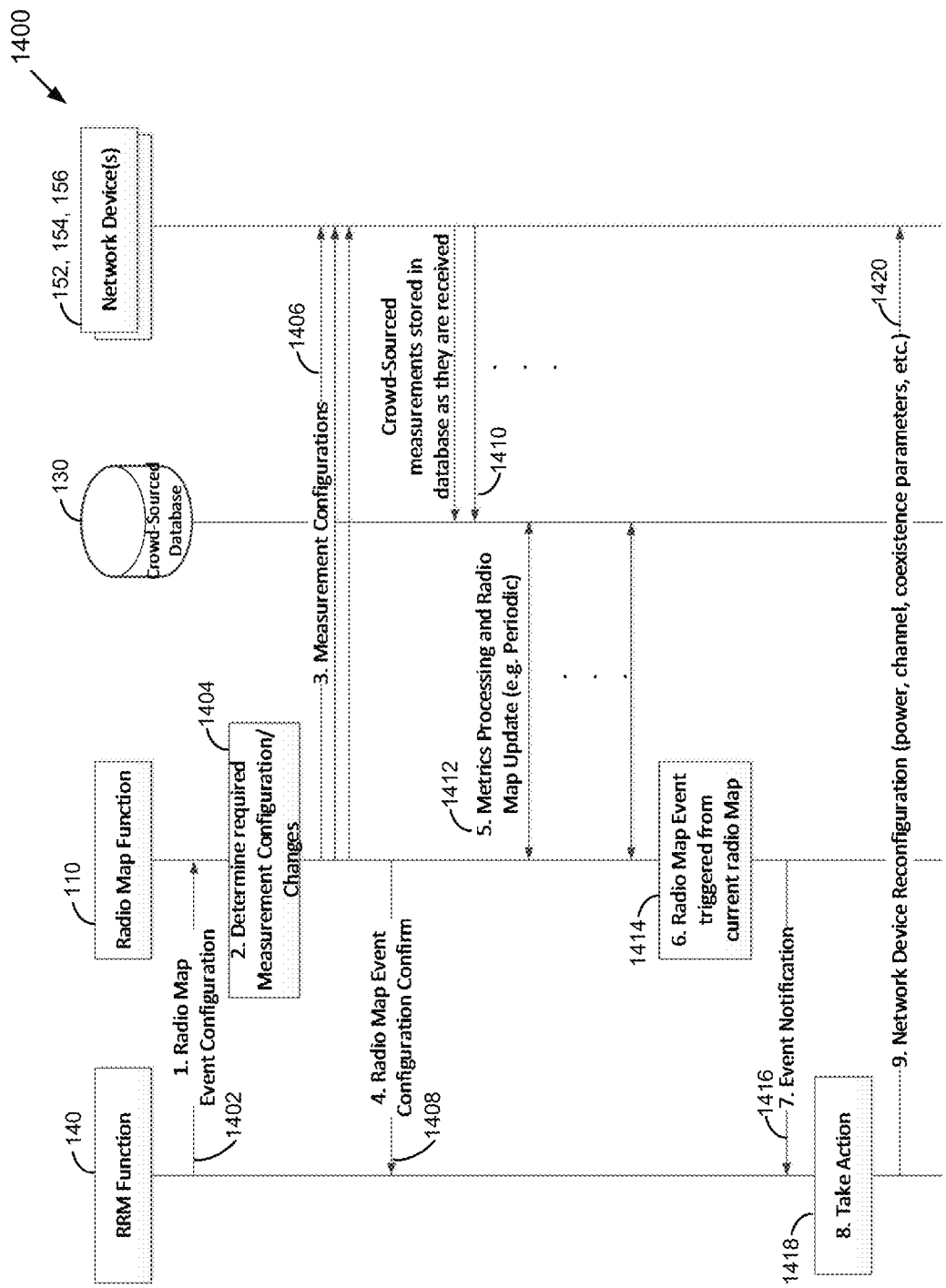
FIG. 14 illustrates a call flow diagram for adjusting configurations of a self-organizing network based at least in part on the occurrence of an event associated with a radio map, in accordance with some embodiments.

FIG. 14 illustrates a call flow diagram 1400 for adjusting configurations of a self-organizing network based at least in part on the occurrence of an event associated with a radio map, in accordance with some embodiments. Call flow diagram 1400 includes RRM 140, radio map function 110, crowd source database 130 and network devices 152, 154, 156 (see FIG. 1). RRM 140 may send a communication 1402 indicating an event configuration to radio map function 110. Examples of an event for monitoring may include: a number of unlocated access points located in a particular area associated with radio map exceeding a threshold, an observed transmission range of a set of located access points falling outside of a desired range of values (e.g., transmission range larger or smaller than a threshold), or interference levels exceeding a threshold based at least in part on real-time measurement or based at least in part on historical crowd sourced data, etc.

At block 1404, radio map function 110 may be configured to determine measurements and/or configuration changes desired for one or more of the network devices 152, 154, 156 based at least in part on the event configuration. Radio map function 110 may then send one or more communications 1406 providing measurement configurations to one or more of the network devices 152, 154, 156. Radio map function 110 may then send a communication 1408 confirming the event configuration to RRM 140.

Network devices 152, 154, 156 may then send communications 1410 indicating measurements to crowd source database 130 based at least in part on the measurement configurations received from radio map function 110 in communications 1406. Crowd source database 130 may process the measurements indicated in communications 1410 and send one or more communications 1412 indicating the measurements to radio map function 110 either once, periodically, or based at least in part on some triggering event.

At block 1414 radio map function 110 may trigger the configured event based at least in part on the one or more communications 1412 (e.g., indicating the measurements collected by the network devices 152, 154, 156) from crowd source database 130. In response radio map function 110 may send an event trigger notification 1416 to RRM 140.

At block 1418 RRM 140 may take an action based at least in part on receipt of the event trigger notification 1416. In some embodiments, radio map function 110 may build a hypothetical radio map reflecting potential operating parameter reconfigurations for one or more of the network devices 152, 154, 156. RRM 140 may utilize the hypothetical radio map in determining an optimal or desired course of action. RRM 140 may then send one or more communications 1420 indicating reconfiguration of one or more operating parameters (e.g., transmit power, channel, or other coexistence parameters) to one or more of the network devices 152, 154, 156.

In some embodiments, radio map function 110 may identify areas of a radio map that are "metrics poor." "Metrics poor" areas of the radio map may require additional measurements to be collected from network devices to ensure the proper accuracy and density of the radio map. In some embodiments, radio map function 110 may identify metrics poor areas and further configure any devices within the metrics poor area(s) to perform additional measurements, e.g., by entering a "survey mode" of operation, in order to improve the metrics in the metrics poor area(s).

Many criteria may be used to determine that an area is "metrics poor." For example, a metrics poor determination may be based on the ratio between measurement-based pixels (i.e. pixels colored based on actual measurements) versus estimated pixels (e.g., pixels colored based on propagation models between access points). As another example, a metrics poor determination may be based on receiving an indication from a network entity, such as a radio resource manager, that a certain number of access points in a given area have been recently activated, particularly where a limited set of metrics have been collected in that area for those new access points. As yet another example, a metrics poor determination may be based on detecting new unlocated access points in an area, in particular where the number of new unlocated access points exceeds a predetermined threshold. As another example, a metrics poor determination may be based on the relative age of collected metrics in one or more areas. For example, if a percentage of metrics collected for a given area age beyond a certain time-based threshold (e.g., 10 hours) or if they were taken before a certain time (e.g., before a particular time and date), then areas associated with those metrics may be determined to be metrics poor. Because it is generally not expected that access points or obstructions will move or change during relatively short time periods, it similarly not expected that the metrics will need to be frequently updated absent new information, such as the examples discussed above. However, if no new measurement has been taken in an area for a relatively long period of time, the chance that, for example, new unlocated access points may have joined the network, is increased.

In some embodiments, the radio map function may host a process that will periodically assess a plurality of geo-location areas. Each geo-location area could be defined using, for example, primitive geometries such as triangles, squares, rectangles, hexagons, etc. While each geo-location area may be the same size, each individual geo-location area may use different pixel sizes depending on the location characteristics. For instance, in a specific geographical area where the expected amount of wireless traffic could be high (e.g. in a downtown area, or in and around a large office complex), the pixel size may be small to allow for better resolution of the radio map. In some other implementations, pixel size may be determined based at least in part on the desired granularity and/or accuracy of the radio map information.

In some embodiments, it may be desirable to reconfigure a device entering a metric poor area. For example, if the radio map function is processing a metric from a device in an area tagged as metric poor, the radio map function can tag the device as originating from a metric poor area and subsequently reconfigure the device to provide more metrics. For example, the device could be reconfigured by shortening the periodicity of the measurements and/or metrics that it provides. As an alternative, the radio map function may transmit a message to the device that may prompt a user to accept the device entering a survey mode.

When a device enters the survey mode, the device may receive commands from the radio map function (or by a sub-process or sub-entity of the radio map function) specifically meant to control the survey mode. In some embodiments, the radio map function may send a list of commands or instructions to the device which cause an application on the device to indicate to a user of the device one or more movements that the user should make during the survey (for instance, walk in a specific direction or to a specific location). The commands may also contain required interaction with the application/device interface that the user should make (e.g. walk 10 meters before pressing a particular button). The commands may also request that the user identify obstructions (e.g., walls or other obstacles) by walking to those obstructions and then appropriately interacting with an application on the device (e.g., pressing a particular button when facing and/or standing near a wall). In other embodiments, the survey mode may include having the user identify his location on a map when an application is open, or when a message is received from the radio map function. Then, the application may convert the position indicated by the user on the map into a geolocation and send the geolocation with associated metrics to the radio map function.

Further, while in the survey mode, the radio map function may access crowd-sourced metrics (e.g., stored in crowd-source database 130 of FIG. 1) more often than in the regular periodic mode.

Figure 15:
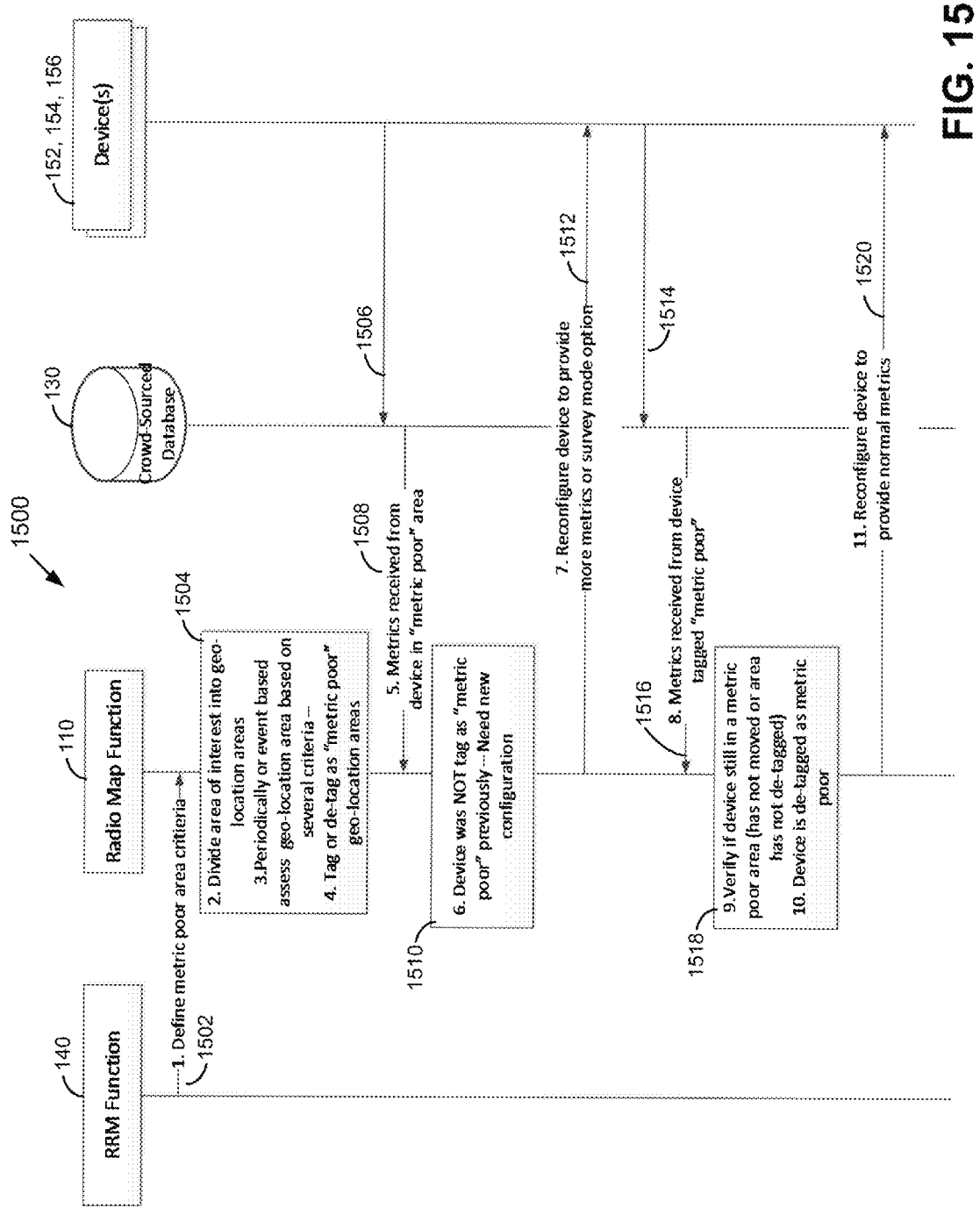
FIG. 15 illustrates a call flow diagram for identifying areas of a radio map that are metrics poor, in accordance with some embodiments.

FIG. 15 illustrates a call flow diagram 1500 for identifying areas of a radio map that are metrics poor, in accordance with some embodiments. Call flow diagram 1500 includes RRM 140, radio map function 110, crowd source database 130 and network devices 152, 154, 156 (see FIG. 1).

RRM 140 may send a communication 1502 defining criteria of a "metrics poor area" to radio map function 110. At block 1504, radio map function 110 may divide the radio map into areas of interest. Periodically or based at least in part on the occurrence of one or more predefined triggering events, radio map function 110 may assess each area of interest based at least in part on the criteria defined by RRM 140 in communication 1502. Based at least in part on the assessment, radio map function 110 may tag or de-tag one or more area of interest as "metric poor". For example, radio map function 110 may identify an area of interest (e.g., a portion) of the radio map for additional metrics to be collected in which at least one of the network devices 152, 154, 156 is located and receives a communication having a received signal strength that is less than a configurable threshold.

One or more of the network devices 152, 154, 156 in a "metrics poor area" may send communications 1506 indicating measured metrics to crowd source database 130. Crowd source database 130 may send a communication 1508 indicating those measured metrics to radio map function 110 in real-time, periodically, or based at least in part on the occurrence of one or more predefined triggering events, such as, for example, the detection of interference, noise, congestion, initial device boot-up, and other events as are known to persons of skill in the art.

In block 1504 areas, but not necessarily specific devices, may have been tagged as "metrics poor" areas. At block 1510 if a device 152, 154, 156 that transmitted the metrics (1506) from the "metrics poor" area of the radio map is not tagged as "metrics poor", radio map function 110 may tag the device 152, 154, 156 itself as a "metrics poor" device. Radio map function 110 may then send a communication 1512 to the device 152, 154, 156 recently tagged as "metrics poor" indicating reconfigurations for that device to provide more metrics and/or to initiate an interactive application with radio map function 110 instructing a user of the device to move the device to one or more locations within the "metrics poor" area such that the device may collect and send more metrics from those locations and/or allow the user to manually identify the location of obstructions, walls, doors or windows (for example) refining radio map.

The device 152, 154, 156 may then send one or more communications 1514 indicating additional metrics measured at those "metrics poor" locations to crowd source database 130. Crowd source database 130 may then send a communication 1516 indicating those additional metrics to radio map function 110 in real-time, in near real-time, periodically, or in response to the occurrence of a triggering event.

At block 1518, radio map function 110 may verify if the device is still in a "metrics poor" area (e.g., the device may have moved out of a "metrics poor" area or the area may have been detagged). If the device is no longer in a metrics poor area, radio map function 110 may detag the device at block 1518. Likewise, if an area previously tagged as "metrics poor" is no longer such, radio map function 110 may detag that area. In response to such detag decisions, radio map function 110 may send a communication 1520 to the detagged device 152, 154, 156 indicating that it should provide normal metrics (e.g., it is no longer in a "metrics poor" area).

Figure 16:
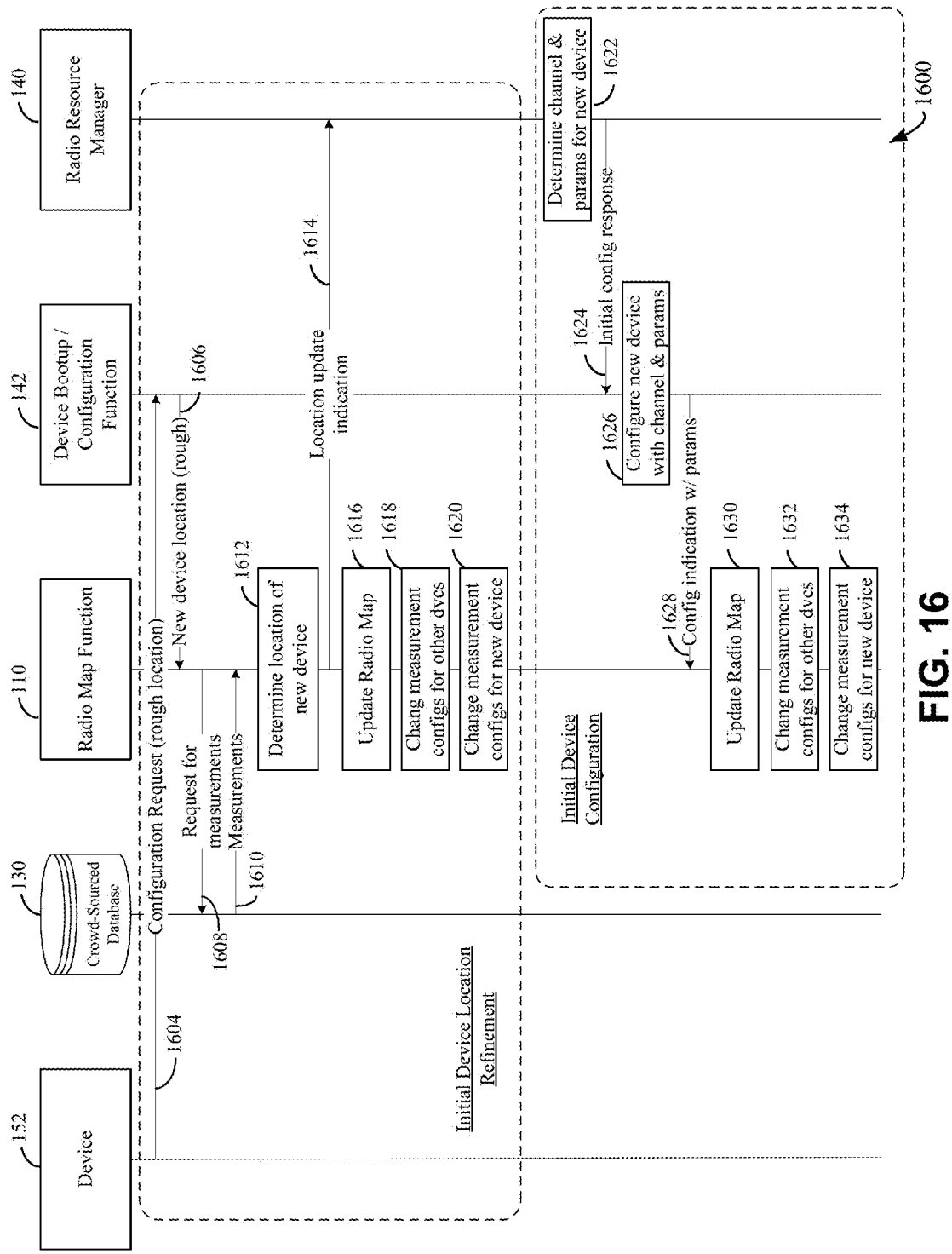
FIG. 16 illustrates a call flow diagram for informing the radio map function of the addition of a located access point, in accordance with some embodiments.

In some embodiments, additional network devices may enter an already established self-organizing network. FIG. 16 illustrates a call flow diagram 1600 for informing radio map function 110 of the addition of a device, in accordance with some embodiments. Call flow diagram 1600 includes device 152, crowd source database 130, radio map function 110, device bootup/configuration function 142, and radio resource manager 140 (see FIG. 1). The call flow initiates when device 152 (e.g., an access point) powers up and sends a configuration request 1604 to, for example, the device bootup/configuration function 142. In some embodiments, the request 1604 may include a rough location of the new access point or eNodeB managing the device.

An initial location of the device may then be refined. RRM 140 may transmit a communication 1606 indicating the rough location of the new device to radio map function 110. In some embodiments, radio map function 110 performs an initial update of the radio map to reflect the rough location of the new device (not shown). In response, radio map function 110 may send a request 1608 to fetch measurements from the new device to crowd source database 130. Crowd source database 130 may send a communication 1610 indicating the requested measurements to radio map function 110. At block 1612, radio map function 110 may determine the location of the new device based at least in part on the measurements indicated in communication 1610. In some embodiments, this may be carried out as previously described in connection with any of FIGS. 2-12. Radio map function 110 may then send a communication 1614 indicating the updated location for the new access point to RRM function 140. At block 1616, radio map function 110 may update the radio map to indicate the new device at a pixel corresponding to the updated location. At block 1618, radio map function 110 may change the measurement configuration of one or more other devices (e.g., other access points) to minimize interference based at least in part on the updated location of the new device. At block 1620, radio map function 110 may configure measurements for the new device to carry out.

The device may then be initially configured. For example, at block 1622, RRM 140 may use radio map information generated by radio map function 110 to select one or more communication channels within the new device. In some embodiments, RRM 140 may also set a transmit power for the device. RRM 140 may send an initial configuration response 1624 to device bootup/configuration function 142. The response 1624 may include a channel indication and indications for one or more operating parameters of the new device (e.g., the newly set transmit power for the device). At block 1626, device bootup/configuration function 142 may configure the device with the selected channel and operating parameters indicated in response 1624. Device bootup/configuration function 142 may then send a communication 1628 indicating the device configuration to radio map function 110. The communication 1628 may indicate the operating parameters actually configured for the new device. In response, radio map function 110 may update the radio map at block 1630, change the measurement configuration and/or operating parameters (e.g., channel selection, transmit power, and/or other parameters) of one or more other devices at block 1632, and configure measurements and/or operating parameters (e.g., channel selection, transmit power, and/or other parameters) for the new device at block 1634.

The initial device location refinement comprising blocks and/or communications 1606-1620 may occur in serial or in parallel with the initial device configuration comprising blocks and/or communications 1622-1634 in some embodiments. Thus, in some embodiments, blocks 1616 and 1630 may be substantially the same operations, blocks 1618 and 1632 may be substantially the same operations, and blocks 1620 and 1634 may be substantially the same operations.

Figure 17:
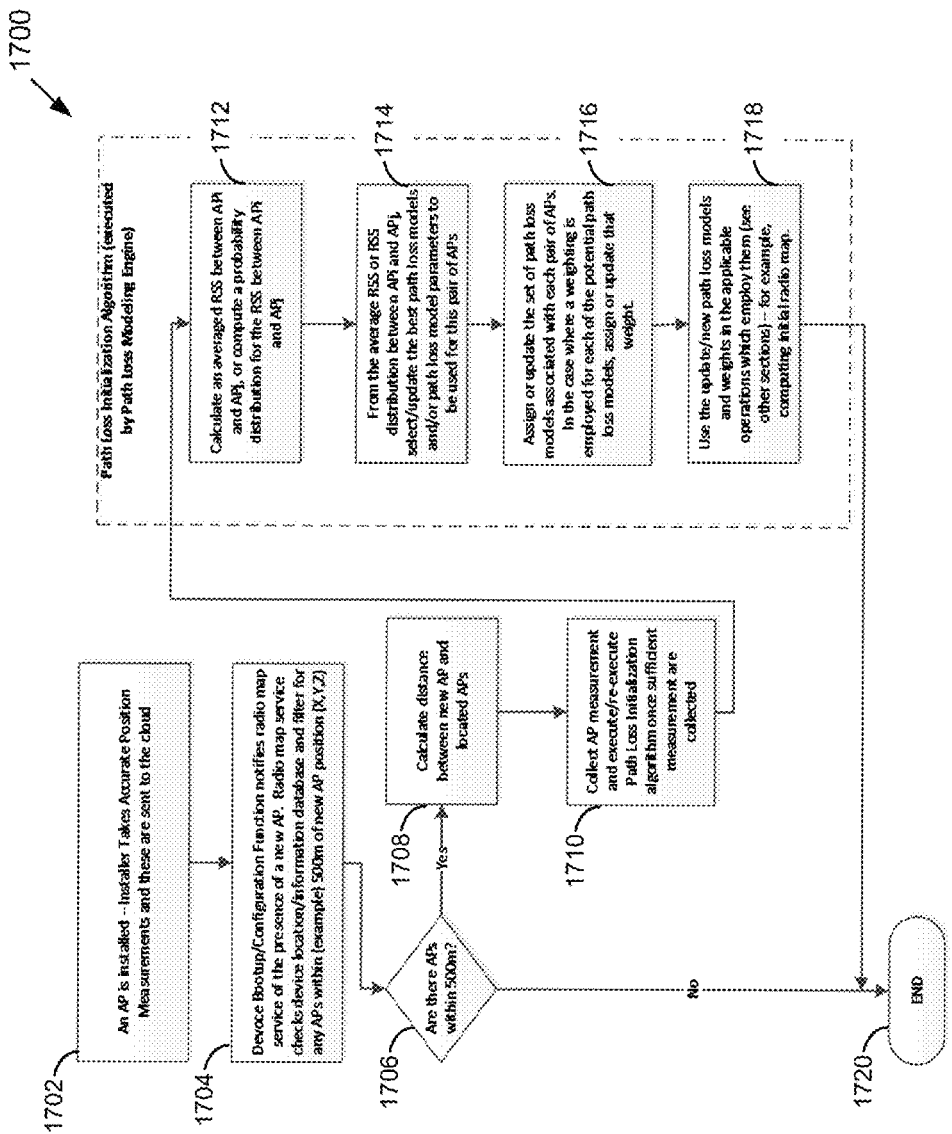
FIG. 17 illustrates a flowchart for initializing a new located access point in a self-organizing network, in accordance with some embodiments.

FIG. 17 illustrates a flowchart 1700 for initializing a new located access point in a self-organizing network, in accordance with some embodiments. At block 1702, an installer may install the new located access point. The installer takes accurate position (e.g., location) measurements and sends them to the cloud, for example device location database 126 of FIG. 1. Flowchart 1700 advances to block 1704, where device bootup/configuration function 142 notifies radio map function 110 of the presence of the new located access point. Radio map function 110 may query device location database 126 for any known access points located within a predetermined range, for example 500 m, of the new access point.

Flowchart 1700 advances to block 1706, where radio map 110 determines whether there are any access points within a predetermined range (e.g., 500 m) based at least in part on the query at block 1704. If the determination is NO, flowchart 1700 advances to end block 1720. If the determination is YES, flowchart 1700 advances to block 1708, where radio map function 110 calculates distances between the new located access point and each existing located access point within the predetermined range (e.g., 500 m).

Flowchart 1700 then advances to block 1710, where radio map function 110 collects access point measurements. Path loss modeling engine 114 of radio map function 110 may execute path loss initialization (e.g., blocks 1712-1718) once sufficient measurements are collected.

Flowchart 1700 then advances to block 1712, where radio map function 110 calculates an averaged RSS or probability distribution for the RSS between each pair of adjacent located access points. For example, in some embodiments, measured RSS values may be averaged over a predetermined interval of time (e.g., 1, 2, 3, 6, or 12 minutes). Flowchart 1700 advances to block 1714, where radio map function 110 selects the best path loss model parameters for each pair of adjacent located access points based at least in part on the average RSS or RSS distribution calculated in block 1712. Flowchart 1700 advances to block 1716, where radio map function 110 assigns or updates the set of path loss models. Where a weighting is employed for each of the potential path loss models, the weights are assigned or updated. Flowchart 1700 advances to block 1718, where the new or updated path loss models and weights are utilized by the application(s) that employ them, e.g., for computing or re-computing an initial radio map as previously described in connection with FIGS. 2-12.

Figure 18:
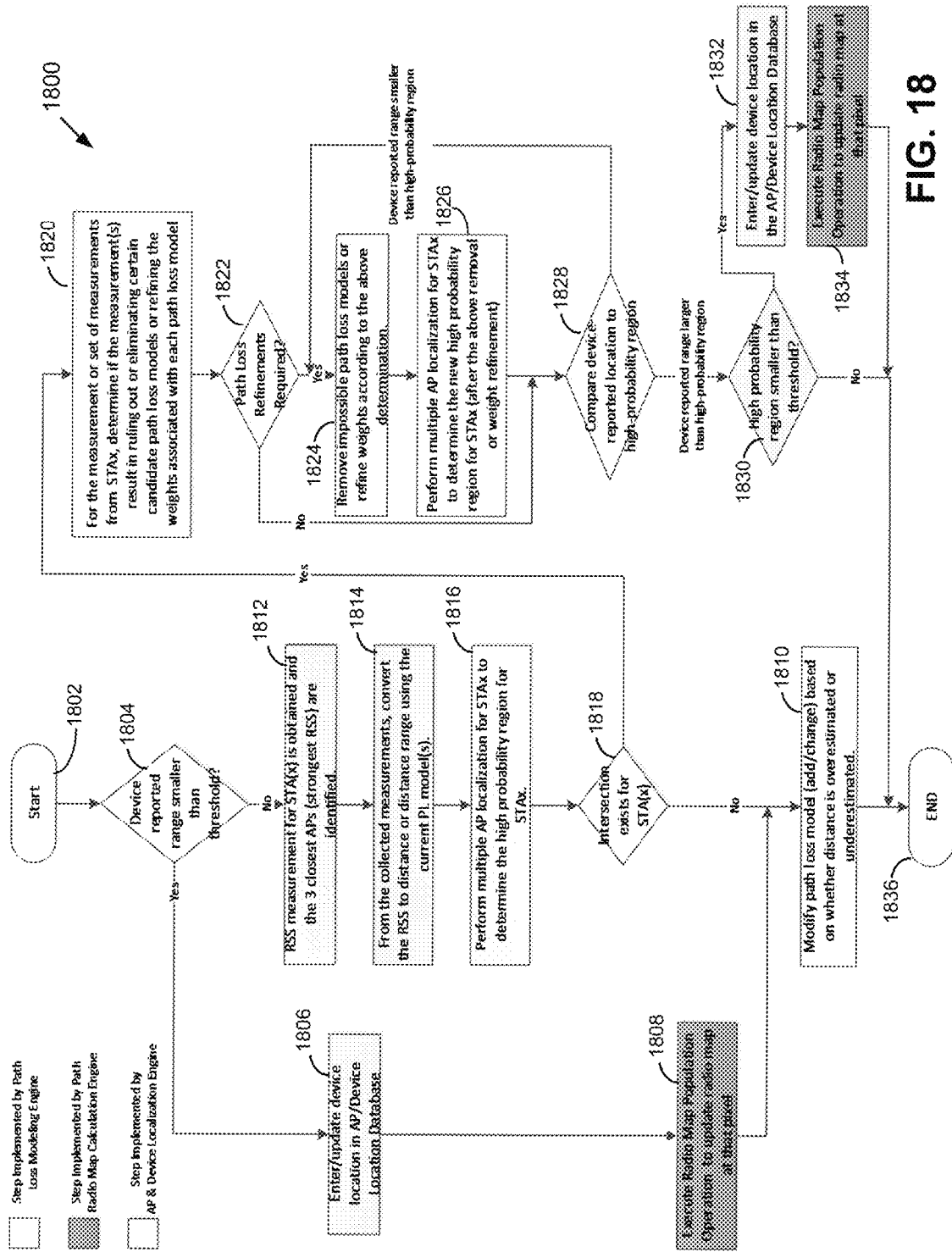
FIG. 18 illustrates a flowchart for refining a path loss model utilized to build a radio map, in accordance with some embodiments.

FIG. 18 illustrates a flowchart 1800 for refining a path loss model utilized to build a radio map, in accordance with some embodiments. Flowchart 1800 may begin at start block 1802 and may advance to block 1804, where localization engine 118 of radio map function 110 determines whether the reported range of a device is smaller than a predetermined threshold. If the determination is YES, flowchart 1800 advances to block 1806 where localization engine 118 of radio map function 110 updates the device location in device location database 126 (see FIG. 1). Flowchart 1800 advances to block 1808, where radio map calculation engine 116 of radio map function 110 updates the radio map at that pixel. Block 1808 may correspond to FIG. 12, where a location of an unlocated device is selected, however, at block 1808 the location is based on a rough device-reported location.

Flowchart 1800 may advance to block 1810, where the path loss modelling engine 114 of radio map function 110 modifies the path loss model based at least in part on whether the distance to the device is overestimated or underestimated. Such over or underestimation may be as previously described in connection with FIGS. 8A and 8B. Flowchart 1800 then advances to end block 1836.

Returning to block 1804, if the determination is NO, flowchart 1800 advances to block 1812, where localization engine 118 of radio map function 110 obtains RSS measurements for the device (e.g., an unlocated access point) and identifies the three access points associated with the strongest RSS. Flowchart 1800 advances to block 1814, where localization engine 118 converts the RSS values to distances or distance ranges between the device and each of the three access points using the current propagation loss model(s). Flowchart 1800 advances to block 1816, where localization engine 118 determines a high probability region for the location of the device based at least in part on overlap of the distances or distance ranges determined in block 1814. Flowchart 1800 advances to block 1818, where localization engine 118 determines whether an overlap or intersection of the distances or distance ranges for each of the three access points occurs at any location(s). If the determination is NO, flowchart 1800 advances to block 1810 and then to end block 1836 as previously described. Blocks 1812, 1814, 1816 may correspond to previous description in connection with FIGS. 7 and 9.

If the determination is YES at block 1818, flowchart 1800 advances to block 1820, where path loss modeling engine 114 of radio map function 110 determines if any candidate path loss models may be eliminated or if weights associated with each path loss model may be refined. Flowchart 1800 advances to block 1822 where the determination of block 1820 is made. If the determination is NO, flowchart 1800 advances to block 1828. If the determination is YES, flowchart 1800 advances to block 1824 where path loss modeling engine 114 removes impossible path loss models or refines the weights described in connection with blocks 1820, 1822. Flowchart 1800 advances to block 1826 where path loss modeling engine 114 determines the high probability region for the location of the device after removal of impossible path loss models and/or adjustment to the weights associated with each remaining path loss model. Blocks 1820, 1822, 1824, 1826 may correspond to previous description in connection with FIGS. 10-12.

Flowchart 1800 advances to block 1828, where path loss modeling engine 114 compares the device-reported location to the high-probability region determined at block 1826. If the reported range of the device is smaller than the high-probability region, flowchart 1800 advances back to block 1824. If the reported range of the device is larger than the high-probability region, flowchart 1800 advances to block 1830, where localization engine 118 determines whether the high-probability region is smaller than a predetermined threshold. If the determination is NO, flowchart 1800 advances to end block 1836. If the determination is YES, flowchart 1800 advances to block 1832, where the localization engine 118 of radio map function 110 enters or updates the device location in device location database 126. Flowchart 1800 then advances to block 1834, where radio map calculation engine 118 executes radio map population to update radio map at the pixel of radio map associated with the device location. Flowchart 1800 then advances to end block 1836.

In some embodiments, as previously described in connection with FIGS. 2-12, positions of an unlocated access point or device may be estimated based predominantly on the known locations of a plurality of located access points (e.g., at least three or four located access points) and RSS values of communications between the unlocated access point or device and those located access points. Such embodiments may allow accurate determination of the location of the unlocated access point or device is areas where few metrics have been collected from local devices. However, in areas where a large number of metrics have been collected from local devices, those metrics may be predominantly utilized for building a radio map. In some embodiments, a hybrid of these methods may be utilized. For example, a weighted sum of the estimated location and the location determined based at least in part on measured metrics may be utilized, where the weight attributed to the measured metrics decreases in relative and/or absolute terms compared to the weight attributed to the estimated locations as the location moves away from areas having the large number of metrics. In such embodiments, radio map function 110 may transition from a radio map building phase to a radio map maintenance phase on an area-by-area basis when calculated accuracy of the locations of devices within an area of the radio map exceeds a threshold.

Figure 19:
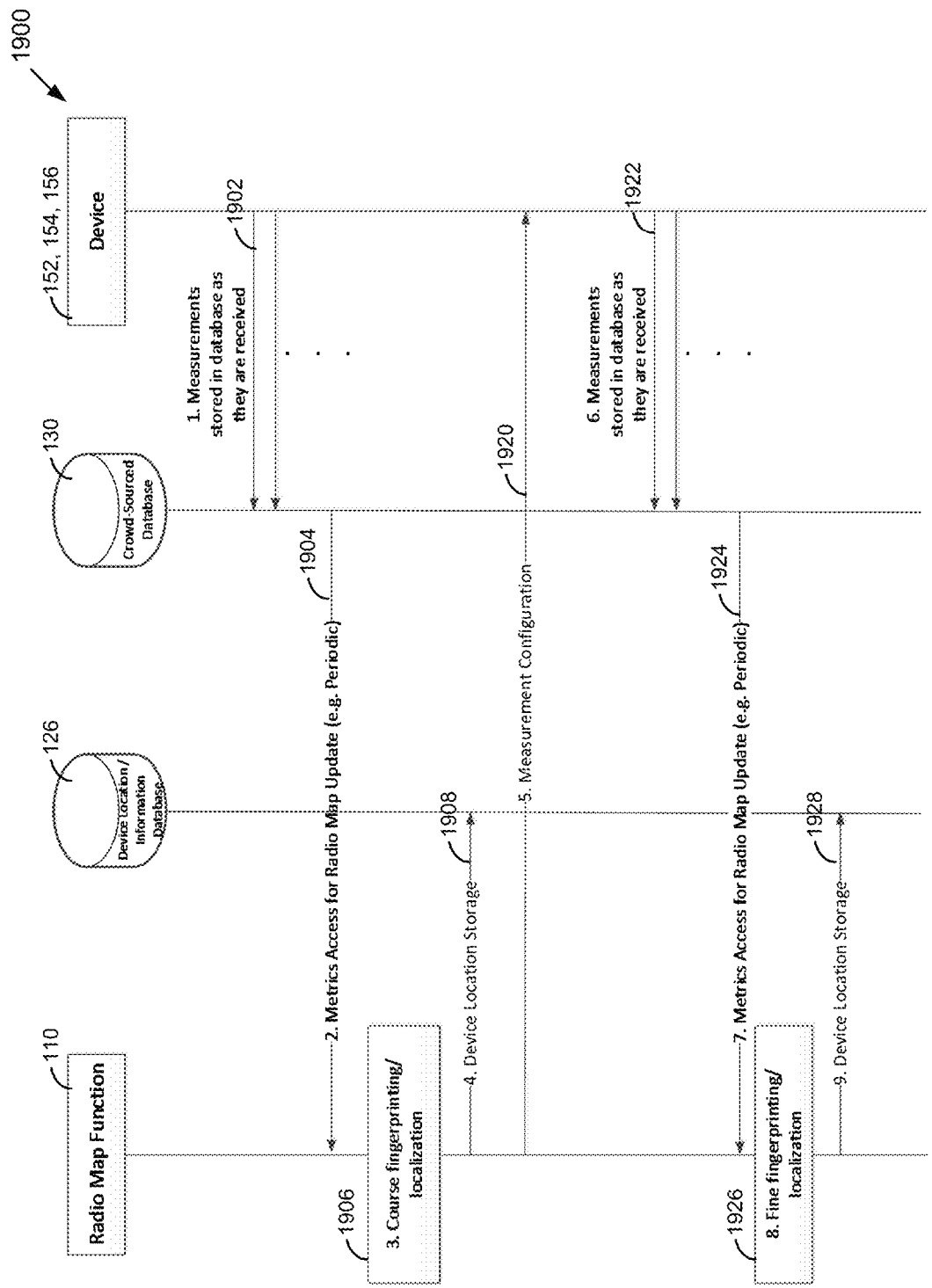
FIG. 19 illustrates a call flow diagram for locating a device based at least in part on a correlation between an estimated radio map and measurements reported from the device, in accordance with some embodiments.

FIG. 19 illustrates a call flow diagram 1900 for locating a device based at least in part on a correlation between an estimated radio map and measurements reported from the device, in accordance with some embodiments. Call flow diagram 1900 includes radio map function 110, device location database 126, crowd source database 130 and devices 152, 154, 156 (see FIG. 1). Device 152, 154, 156 sends one or more communications 1902 indicating measured network metrics 1902 to crowd source database 130, where the metrics are stored as they are received. Crowd source database 130 may send a communication 1904 indicating those metrics to radio map function 110 in real-time, in near real-time, periodically, or based at least in part on some triggering event. At block 1906, radio map function 110 determines a rough (e.g., coarse) localization of device 152, 154, 156 based at least in part on the metrics indicated by communication 1904 received from crowd source database 130. For example, radio map function 110 may determine an area or set of potential pixels of the radio map as the potential location of device 152, 154, 156. Radio map function 110 may send a communication 1908 indicating this rough device location to device location database 126. Radio map function 110 may also transmit a communication 1920 to the device 152, 154, 156 and/or to another device located near the device 152, 154, 156 indicating a configuration for additional measurements to be made by the addressed device.

In response, device 152, 154, 156 (or the other device located near device 152, 154, 156) may make additional measurements based at least in part on the configuration indicated by communication 1920. The device may then send one or more communications 1922 indicating those measurements to crowd source database 130, where the additional metrics are stored as they are received. Crowd source database 130 may send a communication 1924 indicating those metrics to radio map function 110 in real-time, in near real-time, periodically, or based at least in part on some triggering event. At block 1926, radio map function 110 may refine the rough location (e.g., area or set of pixels, see block 1906) of device 152, 154, 156 based at least in part on the rough location and the additional metrics received from crowd source database 130, as measured by device 152, 154, 156 (or another nearby device). In this way, a rough location of an unlocated device may be estimated and then refined based at least in part on additional metrics measured by that unlocated device or other devices located in the general area of the unlocated device.

Figure 20:
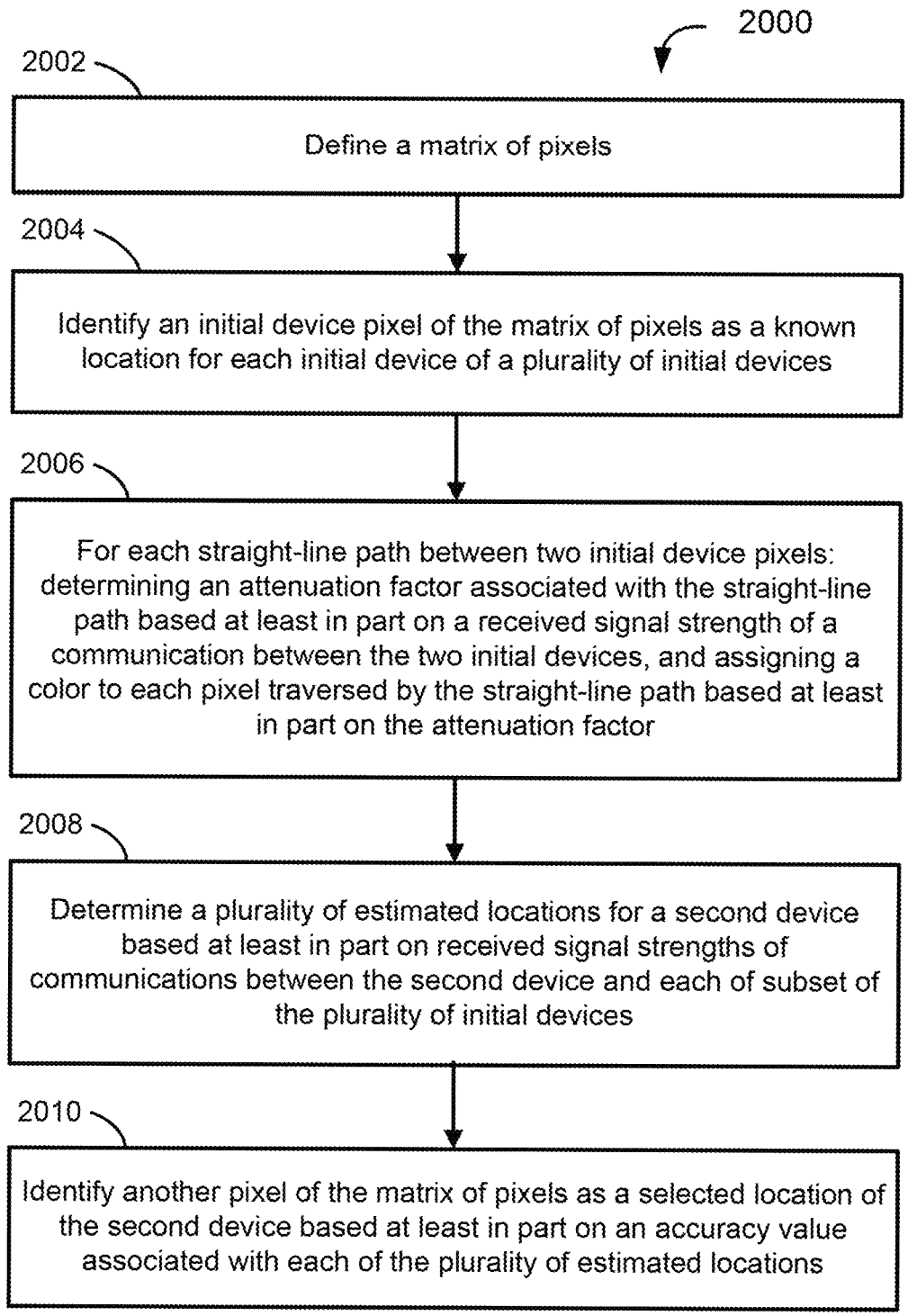
FIG. 20 illustrates a flowchart for generating or updating a radio map, in accordance with some embodiments.

FIG. 20 illustrates a flowchart 2000 for generating or updating a radio map, in accordance with some embodiments. In some implementations, flowchart 2000 may be carried out or performed by radio map function 110 (see FIG. 1). Further, the flowchart 2000 may correspond at least to the description in connection with FIGS. 2-12.

Flowchart 2000 may begin with block 2002, which comprises defining a matrix of pixels. For example, as previously described in connection with FIG. 2, radio map 200 may comprise an m×n matrix of pixels, each pixel associated with a predetermined physical area (e.g., 2 m×2 m, 5 m×5 m, 10 m×10 m, etc.).

Flowchart 2000 continues with block 2004, which comprises identifying an initial device pixel of the matrix of pixels as a known location for each initial device of a plurality of initial devices. For example, as previously described in connection with FIG. 2, radio map 200 indicates a plurality of located access points (e.g., initial devices) $AP_1$, $AP_2$, $AP_3$, $AP_4$, $AP_5$, $AP_6$ (hereinafter $AP_1$-$AP_6$). $AP_1$ is located in pixel B3, $AP_2$ is located in pixel H2, $AP_3$ is located in pixel J6, $AP_4$ is located in pixel E9, $AP_5$ is located in pixel C7, and $AP_6$ is located in pixel F5.

Flowchart 2000 continues with block 2006, which comprises, for each straight-line path between two initial device pixels, determining a wall attenuation factor associated with the straight-line path based at least in part on a received signal strength of a communication between the two initial devices and assigning a color to each pixel traversed by the straight-line path based at least in part on the attenuation factor. For example, as previously described in connection with FIGS. 3-6 as well as EQs. 1 and 2, the straight-line path $AP_1$-to-$AP_2$ is a wall attenuation factor=0 dB path and traverses pixels C3, D3, E3, E2, F2, G2. Traversed pixels C3, D3, E3, E2, F2, G2 are shaded a first color (or pattern) corresponding to wall attenuation factor=0 dB. As described, the pixels traversed by straight-line paths between adjacent access points are shaded colors corresponding to the wall attenuation factors determined along those paths.

Flowchart 2000 continues with block 2008, which comprises determining a plurality of estimated locations for a second device based at least in part on received signal strengths of communications between the second device and each of a subset of the plurality of initial devices. In some implementations, determining the plurality of estimated locations for the second device comprises, for each of the subset of the plurality of initial devices: determining a plurality of estimated distances to the second device, each estimated distance determined based at least in part on a received signal strength of a communication between the second device and the initial device and a different attenuation factor of the straight-line path between the second device and the initial device, and determining a plurality of location regions, each based at least in part on a respective one of the plurality of estimated distances to the second device; and identifying the plurality of estimated locations for the second device where a location region determined for each of the subset of the plurality of initial devices overlap.

For example, as previously described in connection with FIGS. 7 and 9, $AP_i$, $AP_j$ and $AP_k$ may correspond to three located access points associated with the highest RSS values of the located access points (e.g., $AP_1$-$AP_6$) for a particular unlocated device. Radio map function 110 may determine straight-line path distances (d) between the unlocated device and each of $AP_i$, $AP_j$ and $AP_k$ for each of a plurality of wall attenuation factor values (e.g., 0 dB, 5 dB, 10 dB and 15 dB) utilizing EQs. 1 and 2. Such a determination may be based at least in part on the RSS of the received signals where those signals were transmitted from their source(s) with a known power or signal strength. Radio map function 110 may utilize each distance to define a respective estimated location region bounded by concentric circles having radii equal to the distance plus and minus some value(s). Radio map function 110 may determine the candidate location estimates (e.g., $X_1$, $X_2$, and $X_3$) at locations where at least one estimated location region from each of $AP_i$, $AP_j$, and $AP_k$ overlap.

Flowchart 2000 continues with block 2010, which comprises identifying another pixel of the matrix of pixels as a selected location of the second device based at least in part on an accuracy value associated with each of the plurality of estimated locations. For example, as previously described in connection with FIGS. 10-12, a likelihood value for each candidate location estimate may be determined based at least in part on EQ. 5. Each candidate location estimate may then be ranked from highest to lowest location likelihood. The candidate location estimate having the highest location likelihood may be selected as the location of the unlocated device.

In some embodiments, for each estimated location of the plurality of estimated locations, the accuracy value associated with each of the plurality of estimated locations may be determined based at least in part on comparisons of wall attenuation factors associated with straight-line paths between the estimated location and each of the plurality of initial devices with wall attenuation factors associated with the color of each pixel traversed by the straight-line paths. For example, as previously described in connection with FIGS. 10-11 For each straight-line path between $X_1$ and each of $AP_1$, $AP_2$, $AP_6$ a link delta coefficient $\delta_k$ may be calculated to indicate a difference between the link wall attenuation factor of the straight-line path and the color of the pixels traversed by the straight-line path (e.g., the wall attenuation factor assigned to pixels between located access points), according to EQs. 3 and 4. Once the link delta coefficient $\delta_k$ has been calculated for each straight-line path between the candidate location estimate and the three located access points having the highest RSS, a location likelihood value (e.g., accuracy value) for each candidate location estimate may be determined based at least in part on EQ. 5.

In some embodiments, identifying another pixel of the matrix of pixels as a selected location of the second device is further based at least in part on a received signal strength of a communication between the second device and at least one initial device not utilized in determining the plurality of estimated locations for the second device. For example, as previously described in connection with FIG. 11, the location likelihoods for each candidate location estimate determined utilizing the first set of located access points (e.g., $AP_1$, $AP_2$, $AP_6$) and utilizing the second set of located access points (e.g., $AP_1$, $AP_5$, $AP_6$) may be ranked for selection of the location of the unlocated device as previously described in connection with FIG. 10.

In some embodiments, radio map function 110 may additionally assign a color to each pixel traversed by each straight-line path between the pixel associated with the location of the unlocated device (e.g., unlocated access point, eNodeB, or station) and each pixel associated with a location of a located device (e.g., located access point, eNodeB, or station) based at least in part on an attenuation factor (e.g., wall attenuation factor) associated with the selected location of the unlocated device.

Figure 21:
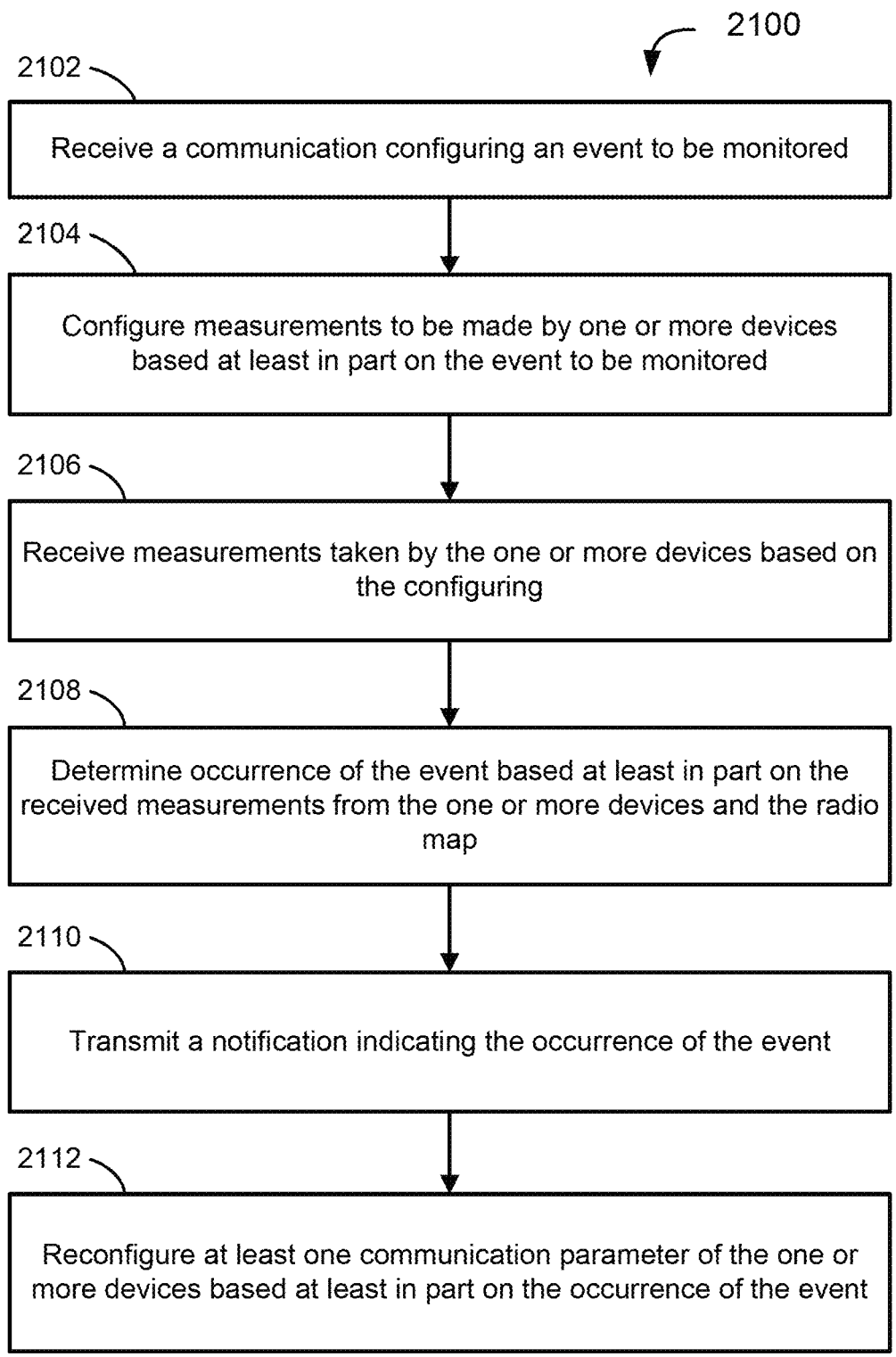
FIG. 21 illustrates a flowchart for adjusting configurations of a self-organizing network based at least in part on the occurrence of an event associated with a radio map, in accordance with some embodiments.

FIG. 21 illustrates a flowchart 2100 for adjusting configurations of a self-organizing network based at least in part on the occurrence of an event associated with a radio map, in accordance with some embodiments. In some implementations, flowchart 2100 may be carried out or performed by radio map function 110 (see FIG. 1). Further, the flowchart 2100 may correspond at least to the description in connection with FIG. 14.

Flowchart 2100 may begin with block 2102, which comprises receiving a communication configuring an event to be monitored. For example, as previously described in connection with FIG. 14, RRM 140 may send a communication 1402 indicating an event configuration to radio map function 110.

Flowchart 2100 continues with block 2104, which comprises configuring measurements to be made by one or more devices based at least in part on the event to be monitored. For example, as previously described in connection with FIG. 14, radio map function 110 may be configured to determine measurements and/or configuration changes desired for one or more of the network devices 152, 154, 156 based at least in part on the event configuration. Radio map function 110 may then send one or more communications 1406 providing measurement configurations to one or more of the network devices 152, 154, 156.

Flowchart 2100 continues with block 2106, which comprises receiving measurements taken by the one or more devices based on the configuring. For example, as previously described in connection with FIG. 14, network devices 152, 154, 156 may send communications 1410 indicating measurements to crowd source database 130 based at least in part on the measurement configurations. Crowd source database 130 may process the measurements indicated in communications 1410 and send one or more communications 1412 indicating the measurements to radio map function 110.

Flowchart 2100 continues with block 2108, which comprises determining occurrence of the event based at least in part on the received measurements from the one or more devices and the radio map. For example, as previously described in connection with FIG. 14, radio map function 110 may trigger the configured event based at least in part on the one or more communications 1412 (e.g., indicating the measurements collected by the network devices 152, 154, 156) from crowd source database 130.

Flowchart 2100 continues with block 2110, which comprises transmitting a notification indicating the occurrence of the event. For example, as previously described in connection with FIG. 14, radio map function 110 may trigger the configured event based at least in part on the one or more communications 1412.

Flowchart 2100 continues with block 2112, which comprises reconfiguring at least one communication parameter of the one or more devices based at least in part on the occurrence of the event. For example, as previously described in connection with FIG. 14, RRM 140 may then send one or more communications 1420 indicating reconfiguration of one or more operating parameters (e.g., transmit power, channel, or other coexistence parameters) to one or more of the network devices 152, 154, 156.

Figure 22:
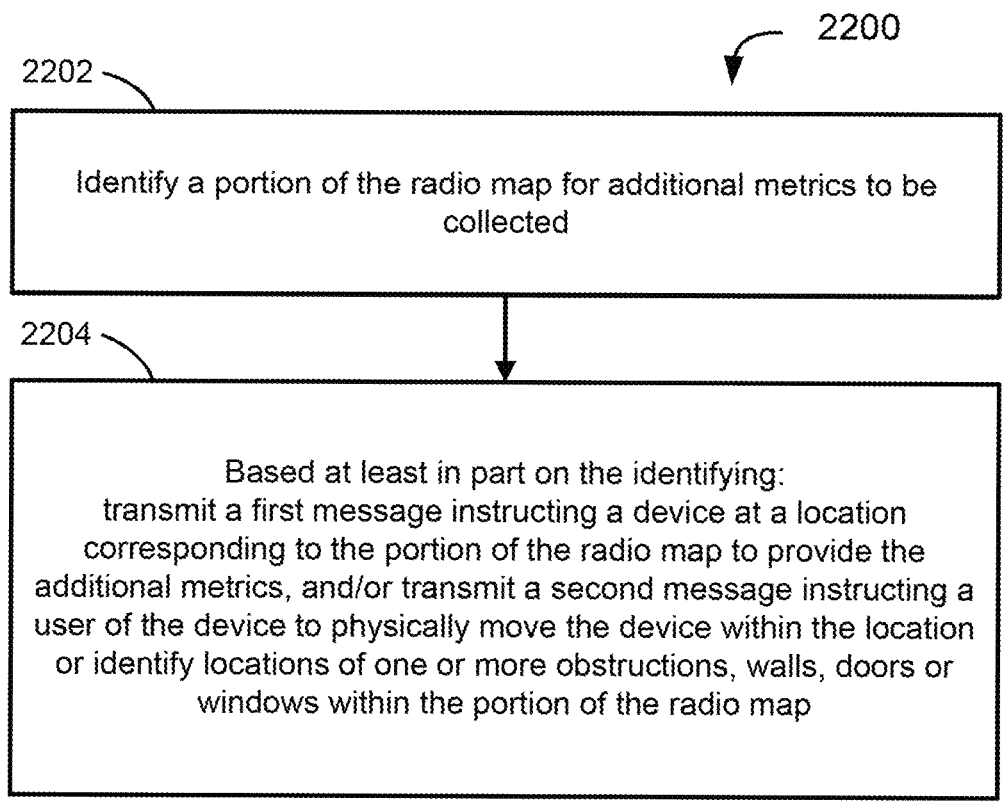
FIG. 22 illustrates a flowchart for identifying areas of a radio map that are metrics poor, in accordance with some embodiments.

FIG. 22 illustrates a flowchart 2200 for identifying areas of a radio map that are "metrics poor", in accordance with some embodiments. In some implementations, flowchart 2200 may be carried out or performed by radio map function 110 (see FIG. 1). Further, the flowchart 2200 may correspond at least to the description in connection with FIG. 15.

Flowchart 2200 may begin with block 2202, which comprises identifying a portion of the radio map for additional metrics to be collected. For example, as previously described in connection with FIG. 15, radio map function 110 may divide the radio map into areas of interest. Periodically or based at least in part on the occurrence of one or more predefined triggering events, radio map function 110 may assess each area of interest based at least in part on the criteria defined by RRM 140 in communication 1502. Based at least in part on the assessment, radio map function 110 may tag or de-tag one or more area of interest as "metric poor".

Flowchart 2200 continues with block 2204, which comprises performing one or more of the following based at least in part on the identifying: transmitting a first message instructing a device at a location corresponding to the portion of the radio map to provide the additional metrics, and transmitting a second message instructing a user of the device to physically move the device within the location or identify locations of one or more obstructions, walls, doors or windows within the portion of the radio map. For example, as previously described in connection with FIG. 15, radio map function 110 may send a communication 1512 to the device 152, 154, 156 recently tagged as "metrics poor" indicating reconfigurations for that device to provide more metrics and/or to initiate an interactive application with radio map function 110 instructing a user of the device to move the device to one or more locations within the "metrics poor" area such that the device may collect and send more metrics from those locations and/or allow the user to manually identify the location of obstructions, walls, doors or windows (for example) refining radio map.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In the present disclosure, certain terminology is used in the following ways. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide.

Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for localizing elements in a wireless network, comprising:
   generating a radio map by:
      defining a matrix of pixels;
      identifying an initial device pixel of the matrix of pixels as a known location for each initial device of a plurality of initial devices;
      for each straight-line path between two initial device pixels:
         measuring a signal strength of a communication between two initial devices associated with the two initial device pixels;
         determining an attenuation factor associated with the straight-line path based at least in part on the measured signal strength of the communication between the two initial devices, and
         assigning a color to each pixel traversed by the straight-line path based at least in part on the attenuation factor;
      determining a plurality of estimated locations for a second device based at least in part on received signal strengths of communications between the second device and each of a subset of the plurality of initial devices; and
      identifying a second pixel of the matrix of pixels as a selected location of the second device based at least in part on an accuracy value associated with each of the plurality of estimated locations.

2. The method of claim 1, further comprising assigning a color to each pixel traversed by each straight-line path between the second device pixel and each initial device pixel based at least in part on an attenuation factor associated with the selected location of the second device.

3. The method of claim 1, wherein determining the plurality of estimated locations for the second device comprises:
   for each respective initial device of the subset of the plurality of initial devices:
      determining a plurality of estimated distances from the respective initial device to the second device, each estimated distance determined based at least in part on a received signal strength of a communication between the second device and the respective initial device and a different attenuation factor of the straight-line path between the second device and the respective initial device, and
      determining a plurality of location regions, each based at least in part on one of the plurality of estimated distances from the respective initial device to the second device; and
   determining a respective estimated location of the plurality of estimated locations based on an overlap of at least one location region associated with each initial device of the subset of the plurality of initial devices.

4. The method of claim 1, further comprising determining the accuracy value associated with each of the plurality of estimated locations based at least in part on, for each estimated location of the plurality of estimated locations, comparisons of attenuation factors associated with straight-line paths between the estimated location and each of the plurality of initial devices with attenuation factors associated with the color of each pixel traversed by the straight-line paths.

5. The method of claim 1, wherein identifying the second pixel of the matrix of pixels as the selected location of the second device is further based at least in part on a received signal strength of a communication between the second device and at least one initial device not utilized in determining the plurality of estimated locations for the second device.

6. The method of claim 1, wherein the plurality of initial devices comprise three initial devices.

7. The method of claim 1, wherein the plurality of initial devices comprise a plurality of located access points, each having a known location and wherein the second device is not a located access point and does not have a known location.

8. The method of claim 1, further comprising: adjusting a size of each pixel of the matrix of pixels based at least in part on at least one of:
   a level of signal traffic in a portion of the radio map,
   a network measurement provided within a predetermined interval of time from locations corresponding to the portion of the radio map, or
   a desired granularity of information indicated in the radio map.

9. The method of claim 1, wherein determining the plurality of estimated locations for the second device further comprises dynamically adjusting at least one parameter of a path loss model configured to determine the plurality of estimated locations.

10. The method of claim 1, further comprising:
   receiving a communication configuring an event to be monitored;
   configuring measurements to be made by the second device based at least in part on the event to be monitored;
   receiving measurements taken by the second device based on the configuring;
   determining occurrence of the event based at least in part on the received measurements from the second device and the radio map indicating the selected location of the second device;

transmitting a notification indicating the occurrence of the event; and reconfiguring at least one communication parameter of the second device based at least in part on the occurrence of the event.

11. The method of claim 1, further comprising:

identifying a portion of the radio map for additional metrics to be collected;

based at least in part on the identifying the portion of the radio map for additional metrics to be collected, performing one or more of:

transmitting a first message instructing the second device at a location corresponding to the portion of the radio map to provide the additional metrics, and transmitting a second message instructing a user of the second device to:

physically move the second device within the location; or identify locations of one or more obstructions, walls, doors or windows within the portion of the radio map.

12. The method of claim 1, further comprising: selecting a communication channel for the second device based at least in part on the radio map.

13. The method of claim 1, further comprising:

receiving an indication of a location of a new access point;

updating the radio map based at least in part on the indication of the location of the new access point;

receiving at least one measurement from the new access point;

refining the location of the new access point based at least in part on the at least one measurement from the new access point; and updating the radio map based at least in part on the refined location.

14. An apparatus configured to operate within a wireless communication network, the apparatus comprising:

a processor configured to generate a radio map by:

defining a matrix of pixels;

identifying an initial device pixel of the matrix of pixels as a known location for each initial device of a plurality of initial devices;

for each straight-line path between two initial device pixels:

measuring a signal strength of a communication between two initial devices associated with the two initial device pixels, determining an attenuation factor associated with the straight-line path based at least in part on the measured signal strength of the communication between the two initial devices, and assigning a color to each pixel traversed by the straight-line path based at least in part on the attenuation factor;

determining a plurality of estimated locations for a second device based at least in part on received signal strengths of communications between the second device and each of a subset of the plurality of initial devices; and identifying a second pixel of the matrix of pixels as a selected location of the second device based at least in part on an accuracy value associated with each of the plurality of estimated locations.

15. The apparatus of claim 14, wherein the processor, in generating the radio map, is further configured to assign a color to each pixel traversed by each straight-line path between the second pixel and each initial device pixel based at least in part on an attenuation factor associated with the selected location of the second device.

16. The apparatus of claim 14, wherein the processor, in generating the radio map, determines the plurality of estimated locations for the second device by:

for each respective initial device of the subset of the plurality of initial devices:

determining a plurality of estimated distances from the respective initial device to the second device, each estimated distance determined based at least in part on a received signal strength of a communication between the second device and the respective initial device and a different attenuation factor of the straight-line path between the second device and the respective initial device, and determining a plurality of location regions, each based at least in part on a respective one of the plurality of estimated distances from the respective initial device to the second device; and determining a respective estimated location of the plurality of estimated locations based on an overlap of at least one location region associated with each initial device of the subset of the plurality of initial devices.

17. The apparatus of claim 14, wherein the processor, in generating the radio map, is further configured to determine the accuracy value associated with each of the plurality of estimated locations based at least in part on, for each estimated location of the plurality of estimated locations, comparisons of attenuation factors associated with straight-line paths between the estimated location and each of the plurality of initial devices with attenuation factors associated with the color of each pixel traversed by the straight-line paths.

18. The apparatus of claim 14, wherein the processor is further configured to base identifying the second pixel of the matrix of pixels as the selected location of the second device at least in part on a received signal strength of a communication between the second device and at least one initial device not utilized in determining the plurality of estimated locations for the second device.

19. The apparatus of claim 14, wherein the plurality of initial devices comprise 3 initial devices.

20. The apparatus of claim 14, wherein the plurality of initial devices comprise a plurality of located access points, each having a known location and wherein the second device is not a located access point and does not have a known location.

21. The apparatus of claim 14, wherein the processor is further configured to adjust a size of each pixel of the matrix of pixels based at least in part on at least one of: a level of signal traffic in a portion of the radio map, a network measurement provided within a predetermined interval of time from locations corresponding to the portion of the radio map, or a desired granularity of information indicated in the radio map.

22. The apparatus of claim 14, wherein, in determining the plurality of estimated locations for the second device, the processor is further configured to dynamically adjust at least one parameter of a path loss model configured to determine the plurality of estimated locations.

23. The apparatus of claim 14, wherein the processor is further configured to:

receive a communication configuring an event to be monitored;

configure measurements to be made by the second device based at least in part on the event to be monitored;

receive measurements taken by the second device based on the configuring;

determine occurrence of the event based at least in part on the received measurements from the second device and the radio map indicating the selected location of the second device;

transmit a notification indicating the occurrence of the event; and reconfigure at least one communication parameter of the second device based at least in part on the occurrence of the event.

24. The apparatus of claim 14, wherein the processor is further configured to:

identify a portion of the radio map for additional metrics to be collected;

based at least in part on the identifying the portion of the radio map for additional metrics to be collected, perform one or more of:

transmitting a first message instructing the second device at a location corresponding to the portion of the radio map to provide the additional metrics, and transmitting a second message instructing a user of the second device to:

physically move the second device within the location; or identify locations of one or more obstructions, walls, doors or windows within the portion of the radio map.

25. The apparatus of claim 14, wherein the processor is configured to select a communication channel for the second device based at least in part on the radio map.

26. The apparatus of claim 14, wherein the processor is further configured to:

receive an indication of a location of a new access point;

update the radio map based at least in part on the indication of the location of the new access point;

receive at least one measurement from the new access point;

refine the location of the new access point based at least in part on the at least one measurement from the new access point; and update the radio map based at least in part on the refined location.

\* \* \* \* \*